US012774156B2

(12) United States Patent
Barr et al.

(10) Patent No.: US 12,774,156 B2
(45) Date of Patent: Oct. 27, 2026

(54) REFUSE COLLECTION SYSTEM

(71) Applicant: Oshkosh Corporation, Oshkosh, WI (US)

(72) Inventors: Paul Barr, Oshkosh, WI (US); Simon Dean, Oshkosh, WI (US); Jeff Koga, Oshkosh, WI (US); Zachary Decker, Oshkosh, WI (US)

(73) Assignee: Oshkosh Corporation, Oshkosh, WI (US)

(*) Notice: Subject to any disclaimer, the term of this patent is extended or adjusted under 35 U.S.C. 154(b) by 401 days.

(21) Appl. No.: 18/381,921

(22) Filed: Oct. 19, 2023

(65) Prior Publication Data

US 2024/0132277 A1 Apr. 25, 2024
US 2024/0228160 A9 Jul. 11, 2024

Related U.S. Application Data

(60) Provisional application No. 63/452,603, filed on Mar. 16, 2023, provisional application No. 63/417,874, filed on Oct. 20, 2022.

(51) Int. Cl.
*B65F 3/04* (2006.01)
*B65F 3/00* (2006.01)

(52) U.S. Cl.
CPC ........ *B65F 3/041* (2013.01); *B65F 2003/006* (2013.01); *B65F 2210/165* (2013.01); *B65F 2210/168* (2013.01)

(58) Field of Classification Search
CPC .... B65F 3/14; B65F 3/041; B65F 9/00; B65F 1/1426; B65F 1/1452; B65F 1/122;
(Continued)

(56) References Cited

U.S. PATENT DOCUMENTS 3,845,968 A 11/1974 Larson
5,181,463 A 1/1993 Lackner
(Continued)

FOREIGN PATENT DOCUMENTS

CN 109178719 A 1/2019
JP 6159127 A 10/2014
(Continued)

OTHER PUBLICATIONS

International Search Report and Written Opinion issued in connection with PCT/US2023/077326 dated Feb. 28, 2024.
(Continued)

*Primary Examiner* — Glenn F Myers
(74) *Attorney, Agent, or Firm* — Foley & Lardner LLP

(57) ABSTRACT

A refuse collection system includes a refuse collection robot and a refuse depot. The refuse collection robot includes a chassis, a tractive element coupled to the chassis, a motor coupled to the chassis and the tractive element and configured to drive the tractive element to propel the refuse collection robot, a refuse container coupled to the chassis and defining a first storage volume, and a controller operatively coupled to the motor. The refuse depot includes a centralized storage defining a second storage volume and a refuse actuator configured to transfer refuse from the first storage volume to the second storage volume. The controller is configured to control the motor to propel the refuse collection to a pickup zone associated with a customer in response to receiving a request for refuse collection from a user device associated with the customer.

18 Claims, 16 Drawing Sheets

(58) Field of Classification Search
CPC .......... B65F 2210/165; B65F 2210/168; B65F 2003/022; B65F 2003/0216; B65F 2003/006; B65F 2003/008
USPC ................................ 414/265, 287, 303, 425
See application file for complete search history.

(56) References Cited

U.S. PATENT DOCUMENTS

| | | | |
|---|---|---|---|
| 5,493,692 | A | 2/1996 | Theimer et al. |
| 7,398,789 | B1 | 7/2008 | Herrera |
| 7,957,937 | B2 | 6/2011 | Waitkus |
| 9,396,453 | B2 | 7/2016 | Hynes et al. |
| 9,829,892 | B1 * | 11/2017 | Rodoni ................ G05D 1/0291 |
| 10,095,240 | B2 | 10/2018 | Rodoni |
| 10,120,389 | B2 | 11/2018 | Rodoni |
| 10,286,558 | B1 | 5/2019 | Asada et al. |
| 10,310,500 | B1 | 6/2019 | Brady et al. |
| 10,481,607 | B2 | 11/2019 | Dumitras |
| 10,994,927 | B2 | 5/2021 | Schuster |
| 11,144,056 | B1 | 10/2021 | Ebrahimi Afrouzi |
| 11,884,485 | B1 * | 1/2024 | Ebrahimi Afrouzi .. G05D 1/247 |
| 12,122,595 | B2 | 10/2024 | Giacobbe |
| 2004/0034538 | A1 * | 2/2004 | Fenelon ................ B65F 1/1426 705/14.1 |
| 2011/0153063 | A1 | 6/2011 | Wurman et al. |
| 2013/0246207 | A1 | 9/2013 | Novak et al. |
| 2014/0125490 | A1 | 5/2014 | Ullrich et al. |
| 2014/0286743 | A1 | 9/2014 | Duivenvoorde |
| 2015/0307273 | A1 | 10/2015 | Lyman |
| 2016/0307413 | A1 | 10/2016 | Rafii et al. |
| 2016/0379468 | A1 | 12/2016 | Wu et al. |
| 2017/0010610 | A1 * | 1/2017 | Atchley .................. G10L 17/22 |
| 2017/0011580 | A1 | 1/2017 | Huang et al. |
| 2017/0174427 | A1 * | 6/2017 | Wagner ................. B65F 1/1468 |
| 2017/0193798 | A1 | 7/2017 | Call et al. |
| 2017/0243363 | A1 | 8/2017 | Rodoni |
| 2017/0349373 | A1 | 12/2017 | Gentry et al. |
| 2018/0029795 | A1 | 2/2018 | Arrez |
| 2018/0079591 | A1 | 3/2018 | Doty et al. |
| 2018/0161980 | A1 | 6/2018 | Anderson et al. |
| 2018/0164828 | A1 * | 6/2018 | Dumitras ............... G01G 19/52 |
| 2019/0121368 | A1 | 4/2019 | Bussetti et al. |
| 2019/0177098 | A1 | 6/2019 | Downing et al. |
| 2019/0352090 | A1 | 11/2019 | Mallady |
| 2021/0022536 | A1 | 1/2021 | Anderson et al. |
| 2021/0049571 | A1 | 2/2021 | Yang |
| 2021/0060786 | A1 | 3/2021 | Ha |
| 2021/0086990 | A1 | 3/2021 | Luke |
| 2021/0188541 | A1 | 6/2021 | Kurani et al. |
| 2021/0200210 | A1 | 7/2021 | Gil |
| 2021/0325911 | A1 | 10/2021 | Koga et al. |
| 2022/0006458 | A1 | 1/2022 | Ahonen et al. |
| 2022/0118854 | A1 | 4/2022 | Davis et al. |
| 2022/0194697 | A1 | 6/2022 | Yoshikawa et al. |
| 2022/0292979 | A1 | 9/2022 | Gwon |
| 2022/0363472 | A1 | 11/2022 | Mutua |
| 2022/0371819 | A1 | 11/2022 | Collins |
| 2022/0380121 | A1 | 12/2022 | Mahabadi |
| 2022/0410688 | A1 * | 12/2022 | Parker .............. B60K 15/03006 |
| 2023/0076374 | A1 * | 3/2023 | Hicks ..................... G01G 19/12 |
| 2023/0156158 | A1 | 5/2023 | Moyne et al. |
| 2023/0264893 | A1 * | 8/2023 | Collins ..................... B65F 1/10 414/404 |

FOREIGN PATENT DOCUMENTS

| | | | |
|---|---|---|---|
| JP | 2020-087134 | A | 6/2020 |
| KR | 20130049222 | A | 5/2013 |
| KR | 102137096 | B1 | 7/2020 |
| WO | WO-95/27564 | A1 | 10/1995 |
| WO | WO-2019/139464 | A1 | 7/2019 |
| WO | WO-2020/028162 | A1 | 2/2020 |
| WO | WO-2020/108658 | A1 | 6/2020 |
| WO | WO-2021/106005 | A1 | 6/2021 |
| WO | WO-2021/218449 | A1 | 11/2021 |

OTHER PUBLICATIONS

Ferri et al., "DustCart, an autonomous robot for door-to-door garbage collection: From DustBot project to the experimentation in the small town of Peccioli," 2011 IEEE International Conference on Robotics and Automation, Shanghai, Chi (Year: 2011).

* cited by examiner

REFUSE COLLECTION SYSTEM

CROSS-REFERENCE TO RELATED PATENT APPLICATIONS

This application claims the benefit of and priority to U.S. Provisional Application No. 63/417,874, filed on Oct. 20, 2022, and U.S. Provisional Application No. 63/452,603, filed on Mar. 16, 2023, the entire disclosures of which are hereby incorporated by reference herein.

BACKGROUND

The present disclosure relates generally to the collection of refuse, such as recyclable or non-recyclable waste, garbage, trash, organics, etc. More specifically, the present disclosure relates to systems that collect refuse from a customer and transport the refuse to a disposal site, such as a landfill, recycling center, composting facility, or organics processing facility.

Traditionally, refuse is collected from a pickup site associated with a customer by a refuse vehicle. These refuse vehicles are manually operated, requiring the presence of a driver throughout operation. The refuse vehicle operates according to a predetermined schedule, providing limited flexibility to the customer to have their refuse collected outside of the schedule.

SUMMARY

At least one embodiment relates to a refuse collection system. The refuse collection system includes a refuse collection robot and a refuse depot. The refuse collection robot includes a chassis, a tractive element coupled to the chassis, a motor, a refuse container, and a controller. The motor is coupled to the chassis and the tractive element and is configured to drive the tractive element to propel the refuse collection robot. The refuse container is coupled to the chassis and defines a first storage volume. The controller is operatively coupled to the motor. The refuse depot includes a centralized storage defining a second storage volume and a refuse actuator. The refuse actuator is configured to transfer refuse from the first storage volume to the second storage volume. The controller is configured to control the refuse collection robot to navigate to a pickup zone associated with a customer in response to a request for refuse collection from a user device associated with the customer.

At least another embodiment relates to a refuse collection method. The method includes receiving, from a customer, a request for collection of refuse. The method also includes determining, by a cloud device, a location of a pickup zone associated with the customer. The method also includes controlling, by a controller of a refuse collection robot, the refuse collection robot to autonomously navigate to the location of the pickup zone. The method also includes receiving, by the refuse collection robot, a volume of refuse from the customer at the pickup zone. The method also includes controlling, by the controller of the refuse collection robot, the refuse collection robot to autonomously navigate to a refuse depot. The method also includes transferring, by a refuse actuator of the refuse depot, the volume of refuse from the refuse collection robot to a centralized storage of the refuse depot. The method also includes emptying the volume of refuse from the centralized storage into a refuse vehicle and transporting, by the refuse vehicle, the volume of refuse to a disposal site.

At least another embodiment relates to a refuse collection system. The refuse collection system includes a refuse collection robot, a refuse depot, and a cloud controller. The refuse collection robot includes a chassis, a tractive element coupled to the chassis, an electric motor coupled to the chassis and the tractive element, a battery electrically coupled to the electric motor, a first charging interface, a refuse container coupled to the chassis and defining a first storage volume, and a controller operatively coupled to the motor. The refuse depot includes a second charging interface configured to supply energy to charge the battery through the first charging interface. The refuse depot also includes a frame anchored to a ground surface. The refuse depot also includes a centralized storage defining a second storage volume. The refuse depot also includes a refuse actuator coupled to the frame and configured to transfer refuse from the first storage volume to the second storage volume. The cloud controller is configured to identify a pickup zone associated with a customer in response to a request for refuse collection from a user device associated with the customer. The cloud controller is also configured to provide a first command that causes the controller to navigate the refuse collection robot to the pickup zone without an input from a user. The cloud controller is also configured to, in response to a determination that the refuse has been placed in the first storage volume, provide a second command that causes the controller to navigate the refuse collection robot to the pickup zone without an input from a user.

At least another embodiment relates to a refuse collection robot. The refuse collection robot includes a chassis, multiple tractive elements rotatably coupled with and supporting the chassis, a propulsion system, a bin, and a lock. The propulsion system includes a battery and an electric motor configured to consume electrical energy from the battery. The propulsion system is configured to drive one or more of the tractive elements to transport the refuse collection robot to a customer location. The bin is removably coupled with the chassis. The bin defines a storage volume for refuse, and includes a cover. The cover is configured to be driven by an actuator to transition between an open position to allow access to the storage volume and a closed position to limit access to the storage volume. The lock is operable between a locked state to limit transition of the cover out of the closed position and an unlocked state to allow transition of the cover out of the closed position and into the open position.

At least another embodiment relates to a refuse collection drone. The refuse collection drone includes a chassis and multiple tractive elements coupled with the chassis. The refuse collection drone also includes a bin that defines a storage volume. The bin and the storage volume are sized to receive a single garbage bag of refuse having a capacity of 12 to 16 gallons or a capacity of 20 to 30 gallons. The refuse collection drone is configured to autonomously transport to a customer location, receive the single garbage bag of refuse, and autonomously transport to a central location.

At least another embodiment relates to a refuse collection drone. The refuse collection drone includes a chassis, multiple tractive elements rotatably coupled with and supporting the chassis, a propulsion system, a bin, a lock, a charging interface, a controller, and a display screen. The propulsion system includes a battery and an electric motor configured to consume electrical energy from the battery. The propulsion system is configured to drive one or more of the multiple tractive elements to transport the refuse collection drone to a customer location. The bin is removably coupled with the chassis. The bin defines a storage volume for refuse, and includes a cover. The cover is configured to be driven by an actuator to transition between an open position to allow access to the storage volume and a closed position to limit access to the storage volume. The lock is operable between a locked state to limit transition of the cover out of the closed position and an unlocked state to allow transition of the cover out of the closed position and into the open position. The charging interface is configured to receive electrical energy to charge the battery. The charging interface includes at least one of a wireless charging interface configured to wirelessly receive electrical energy from an external wireless charging source when the wireless charging interface is within a field of the external wireless charging source or a wired charging interface configured to be driven into electrical engagement with a contact of an external wired charging source. The controller is configured to operate the propulsion system to transport the refuse collection drone to the customer location. The controller is further configured to operate the actuator and the lock to transition the cover into the open position, and responsive to placement of refuse in the storage volume, transition the cover into the closed position and transition the lock from the unlocked state into the locked state. The display screen is positioned externally on the refuse collection drone. The display screen is operable to provide instructions to a user or to provide an advertisement to the user. The instructions to the user include at least one of a notification to remove a particular item from the refuse collection drone or an image of the particular item obtained by a camera of the refuse collection drone.

At least another embodiment relates to a depot for autonomous land-based refuse drones. The depot includes a chassis, a container, a collection implement, and multiple refuse actuators. The chassis is anchored to a ground surface. The container defines a storage volume for refuse. The collection implement is coupled with the chassis. The collection implement is configured to selectively couple with at least one of (i) refuse within a drone storage volume of one of the plurality of autonomous land-based refuse drones at the depot or (ii) a portion of the one of the autonomous land-based refuse drones at the depot that defines the drone storage volume. The refuse actuators are operably coupled with the collection implement. The refuse actuators are configured to drive the collection implement to perform an unloading operation including selectively coupling, moving, and de-coupling from at least one of the refuse within the drone storage volume or the portion of the autonomous land-based refuse drone that defines the drone storage volume. The refuse actuators are configured to drive the collection implement to perform the unloading operation in order to unload the refuse from the drone storage volume into the storage volume of the container.

At least another embodiment relates to a depot for refuse collection robots. The depot includes a chassis, a container, and a collection implement. The chassis is anchored to a ground surface. The container defines a storage volume for refuse. The collection implement and refuse actuators are configured to perform an unloading operation to empty refuse from the refuse collection robots into the storage volume of the container. The container is configured to be emptied into or lifted onto a refuse vehicle.

At least another embodiment relates to a depot for refuse collection robots. The depot includes a chassis, a container, a collection implement and refuse actuators, charging interfaces, a washout system, a compactor, a gate, a weight sensor, a cargo storage area, a camera, and a controller. The chassis is anchored to a ground surface. The container defines a storage volume for refuse. The collection implement and the refuse actuators are configured to perform an unloading operation to empty refuse from the refuse collection robots into the storage volume of the container. The charging interfaces are connected to a power source and configured to couple wirelessly or wiredly with the refuse collection robots to charge a battery of the refuse collection robots. The washout system includes a fluid source, a pump, and a nozzle. The fluid source is configured to provide a cleaning fluid. The pump is fluidly coupled with the fluid source and configured to pressurize the cleaning fluid. The nozzle is fluidly coupled with the pump and configured to discharge the cleaning fluid. The washout system is configured to discharge the cleaning fluid into a drone storage volume of one of the refuse collection robots to clean the drone storage volume after the drone storage volume has been emptied of refuse or before deployment of the refuse collection robot when the drone storage volume is empty. The fluid source includes cleaning fluid collected at a drain of the washout system and recirculated to the pump. The compactor includes a pack panel that partially defines the storage volume of the container and a packing actuator configured to drive the pack panel to translate. The compactor is configured to compact refuse within the container. The gate is coupled with the chassis. The gate is transitionable between a closed position to limit access to the container and an open position to allow access to the container. The chassis further includes housing members configured to define an enclosure within which the container is positioned. The weight sensor is configured to measure a weight of refuse within the container before and after each of multiple performances of the unloading operation to determine an amount of refuse unloaded from each of the refuse collection robots into the container. The cargo storage area is separate from the storage volume of the container. The cargo storage area is provided for storage of a package for delivery to a customer. The refuse actuators are further configured to operate the collection implement to perform a loading operation including selectively coupling with the package and moving the package from the cargo storage area into the drone storage volume of one of the refuse collection robots for delivery to the customer. The camera is configured to obtain image data of the container and an area proximate the container. The controller is configured to receive the image data from the camera and operate the refuse actuators to empty the refuse of the plurality of refuse collection robots into a desired zone of a plurality of zones in the container based on both (i) a location of the plurality of refuse collection robots indicated by the image data, and (ii) an indication of a buildup of refuse at each of the plurality of zones in the container indicated by the image data. The controller is configured to use the image data of the container to identify that the container has reached a predetermined fill level and transmit a request to prompt removal or emptying of the container by a vehicle responsive to the container reaching the predetermined fill level. The container is configured to be emptied into or lifted onto a refuse vehicle.

At least another embodiment relates to a refuse collection system. The refuse collection system includes one or more memory devices storing instructions thereon, that, when executed by one or more processors, cause the one or more processors to perform: receive a request for refuse collection from a customer, the request including a desired time of the refuse collection; identify, based on the request, a location of a pickup zone associated with the customer; and control, based on the request, the refuse collection robot to autonomously navigate to the location of the pickup zone at the desired time and perform the refuse collection.

At least another embodiment relates to a refuse collection method. The refuse collection method includes prompting, by a user device associated with a customer, the customer to request a refuse collection. The method also includes receiving, by the user device, a request for refuse collection and a desired time for the refuse collection. The method also includes controlling a refuse collection robot to autonomously navigate to a pickup zone associated with the customer at the desired time. The method also includes, in response to an indication that the customer has placed a volume of refuse within the refuse collection robot, controlling the refuse collection robot to autonomously navigate to a refuse depot.

At least another embodiment relates to a refuse collection system. The refuse collection system includes a user device, a refuse collection robot, and one or more memory devices. The user device is configured to receive a request for a refuse collection. The request indicates that the refuse collection should be performed as soon as possible. The refuse collection robot includes a chassis, a motor, and a refuse container. The motor is coupled to the chassis and the tractive element and is configured to propel the refuse collection robot. The refuse container is coupled to the chassis. The refuse container is configured to receive a volume of refuse from the customer during the refuse collection. The one or more memory devices store instructions thereon, that, when executed by one or more processors, cause the one or more processors to identify, based on the request, a location of a pickup zone associated with the customer, and control, based on the request, the refuse collection robot to autonomously navigate to the location of the pickup zone perform the refuse collection.

At least another embodiment relates to a refuse collection system. The refuse collection system includes one or more memory devices. The one or more memory devices store instructions thereon, that, when executed by one or more processors, cause the one or more processors to receive a request for refuse collection from a customer. The one or more processors are further configured to execute the instructions to identify, based on the request, a location of a pickup zone associated with the customer. The one or more processors are further configured to execute the instructions to receive location data indicating a current location of the refuse collection robot. The one or more processors are further configured to execute the instructions to generate a route for the refuse collection robot to travel from the current location of the refuse location robot to the location of the pickup zone. The one or more processors are further configured to execute the instructions to control the refuse collection robot to follow the route and perform the refuse collection.

At least another embodiment relates to a refuse collection system. The refuse collection system includes one or more memory devices. The one or more memory devices store instructions thereon, that, when executed by one or more processors, cause the one or more processors to receive a request for refuse collection from a customer. The one or more processors are further configured to execute the instructions to identify, based on the request, a location of a pickup zone associated with the customer. The one or more processors are further configured to execute the instructions to receive first status data indicating a status of a first refuse collection robot. The one or more processors are further configured to execute the instructions to receive second status data indicating a status of a second refuse collection robot. The one or more processors are further configured to execute the instructions to select, based on the first status data and the second status data, either the first refuse collection robot or the second refuse collection robot for performing the refuse collection. The one or more processors are further configured to execute the instructions to generate a route for the selected refuse collection robot to travel to the location of the pickup zone. The one or more processors are further configured to execute the instructions to control the selected refuse collection robot to follow the route and perform the refuse collection.

At least another embodiment relates to a refuse collection method. The refuse collection method includes receiving, by a user device associated with a customer, a request for refuse collection. The refuse collection method also includes identifying, by a cloud controller based on the request, a location of a pickup zone associated with the customer. The refuse collection method also incudes generating, by a sensor of a refuse collection robot, location data indicating a current location of the refuse collection robot. The refuse collection method also includes generating, by the cloud controller, a route for the refuse collection robot to travel from the current location of the refuse location robot to the location of the pickup zone. The refuse collection method also includes commanding, by the cloud controller, the refuse collection robot to follow the route and perform the refuse collection.

At least another embodiment relates to a refuse collection system including one or more memory devices storing instructions thereon, that, when executed by one or more processors, cause the one or more processors to control a refuse collection robot containing a volume of refuse to navigate to a refuse depot, control the refuse depot to remove the volume of refuse from the refuse collection robot, receive a request from a customer for delivery of a package, identify, based on the request, a location of a pickup zone associated with the customer, control the refuse collection robot to receive the package, and control the refuse collection robot to transport the package to the pickup zone.

At least another embodiment relates to a refuse collection system including a refuse collection robot including a chassis, a snow removal element coupled to the chassis, a tractive element coupled to the chassis, a motor coupled to the chassis and the tractive element and configured to drive the tractive element to propel the refuse collection robot, and a refuse container coupled to the chassis. The refuse collection system further includes one or more memory devices storing instructions thereon, that, when executed by one or more processors, cause the one or more processors to control the refuse collection robot to navigate to a refuse depot while the refuse container contains a volume of refuse, control the refuse depot to remove the volume of refuse from the refuse container, receive a request from a customer for snow removal from an area associated with the customer, generate, based on the request, a route for the refuse collection robot that passes through the area, and control the refuse collection robot to travel along the route and remove snow from the area associated with the customer.

At least another embodiment relates to a method including receiving a first request for refuse collection from a first customer, controlling the refuse collection robot to autonomously navigate to a first pickup zone associated with the first customer, receiving a second request for delivery of a package from a second customer, controlling the refuse collection robot to retrieve the package from a package storage area, controlling the refuse collection robot to autonomously transport the package to a second pickup zone associated with the second customer, receiving a third request for snow removal from third customer, generating, based on the request, a route for the refuse collection robot that passes through an area specified in the third request, and control the refuse collection robot to autonomously navigate along the route and remove snow from the area specified in the third request.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

As utilized herein, the term "customer" means an individual or group of individuals requesting a service, such as a refuse collection service. The customer may or may not be required to transfer payment (e.g., funds) in exchange for such a service.

Referring generally to the figures, a refuse collection system includes one or more refuse collection drones, refuse depots, and refuse vehicles. In response to a customer request (e.g., through a user device such as a smartphone or voice activated home device, such as a smart speaker), a refuse collection drone autonomously travels to a pickup zone associated with the customer to receive refuse from the customer. The system can operate in an on-demand fashion, such that the refuse collection drone begins traveling to the pickup zone immediately in response to the request. Once loaded with refuse, the refuse collection drone autonomously navigates to the refuse depot where the refuse is transferred to a centralized storage. This process may be repeated by multiple refuse collection drones until the refuse depot is filled. A refuse vehicle may then empty the refuse from the centralized storage and transport the refuse to a disposal facility. The refuse collection system provides refuse collection services at any time the customer desires, as opposed to operating according to a fixed schedule. Additionally, the refuse collection system can be easily reconfigured for different sized applications by adding or removing refuse collection drones, refuse depots, and refuse vehicles. Because the refuse collection system can provide on-demand removal of refuse, the system can eliminate the need for on-site storage of refuse (e.g., that would otherwise require a permanent garbage can or dumpster to be provided at the customer's pickup location).

System Overview

Figure 1:
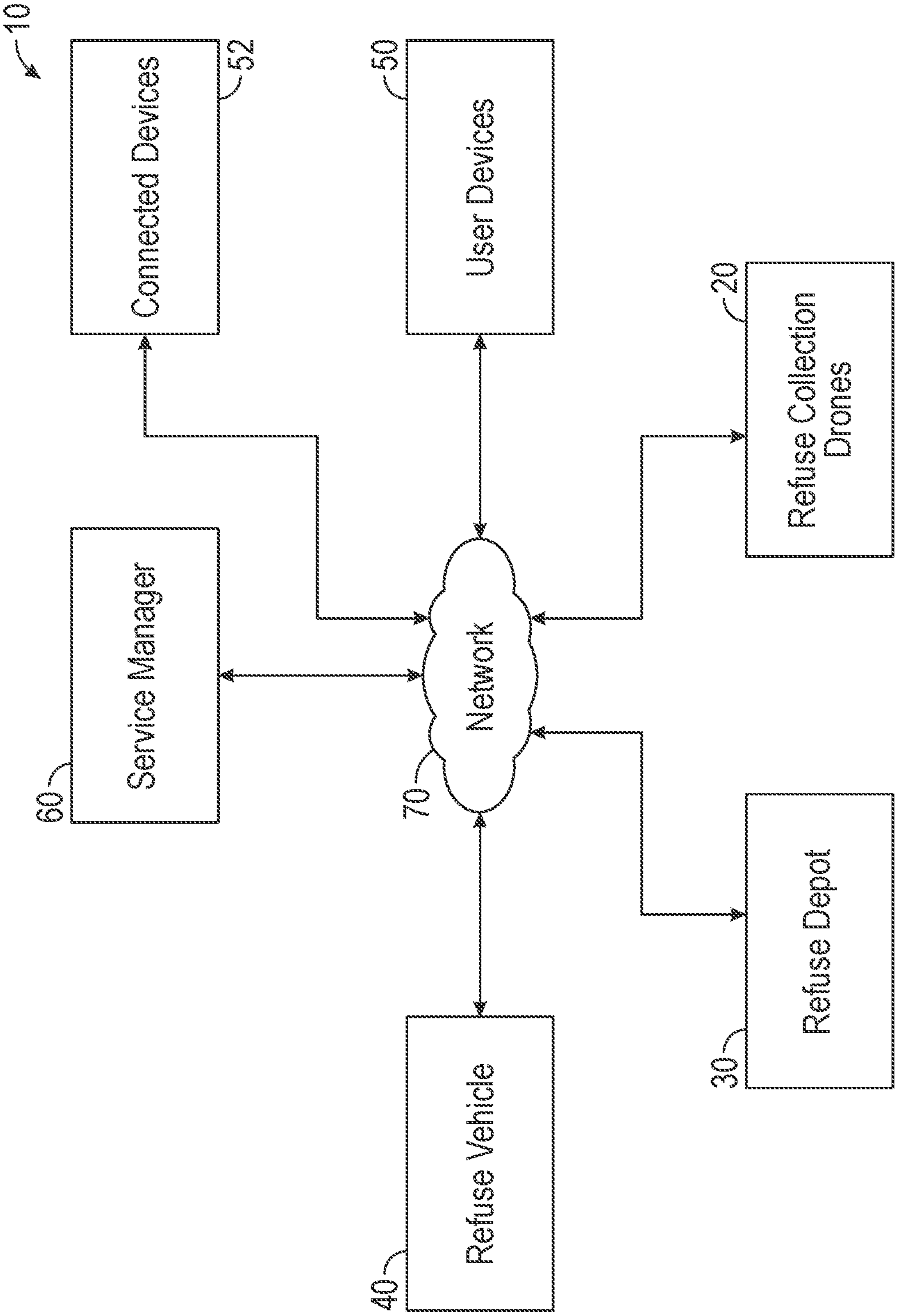
FIG. 1 is a block diagram of a refuse collection system, according to an exemplary embodiment.

Referring to FIG. 1, an autonomous or partially autonomous refuse collection system is shown as system 10, according to an exemplary embodiment. The system 10 is configured to retrieve refuse, such as recyclable or non-recyclable waste, garbage, trash, organics (e.g., organic material such as food waste, yard clippings, wood, brush, etc.), etc., from one or more pickup sites. Each pickup site may be associated with a customer or other individual or group of individuals requesting refuse collection service. By way of example, the pickup site may be a home (e.g., a single family home, a duplex, an apartment building, a condominium, etc.), a business (e.g., a restaurant, an office, a factory, a farm, etc.), a school (e.g., a college campus), a room within a building (e.g., an apartment within an apartment building, a patient room or surgical suite within a hospital, a classroom within a school, an office within an office building, etc.), or another type of location having refuse for collection. The system 10 may operate in an exterior location (e.g., outdoors) and/or within one or more buildings (e.g., indoors). The system transports the refuse to a disposal site, such as a landfill, recycling center, composting facility, or organics processing facility (e.g., a methane harvesting facility).

The system 10 includes one or more autonomous, partially autonomous, or remote-controlled robots or drones, shown as refuse collection drones 20. The refuse collection drones travel to one or more pickup sites, retrieving refuse from a customer at each pickup site. The refuse collection drones 20 transport the refuse to a collection area, staging area, base station, or depot, shown as refuse depot 30. Refuse is unloaded from the refuse collection drones 20 into a larger collection vessel (e.g., a dumpster) of the refuse depot 30. Once several payloads of refuse have been stored in the collection vessel of the refuse depot 30, a refuse collection vehicle (e.g., a front-loading refuse vehicle, etc.), shown as refuse vehicle 40, retrieves the collected refuse from the refuse depot 30 and transports the refuse to a disposal site.

The refuse depot 30 may also facilitate staging the refuse collection drones 20. By way of example, the refuse depot 30 may have a predefined storage area for the refuse collection drones 20 when not in use. The storage area may include one or more chargers to recharge one or more energy storage devices (e.g., batteries) of the refuse collection drones 20.

The system 10 may further include one or more user interfaces or user devices (e.g., smartphones, tables, laptop computers, desktop computers, pagers, smart speakers, AI assistants, etc.), shown as user devices 50. The user devices 50 facilitate communication between a customer and the system 10. By way of example, a customer may provide a command, such as a request for pickup of refuse to the system 10, through the user device 50. By way of another example, the system 10 may communicate the current location of a refuse collection drone 20 to the customer through the user devices 50.

The system 10 may include one or more network attached devices or internet of things devices, shown as connected devices 52. Each of the connected devices 52 may include one or more interfaces, sensors, actuators, and/or controllers. By way of example, the connected devices 52 may include refuse bins, smoke detectors, kitchen appliances, garage door openers, door locks, motion detectors, speakers, etc.

The system 10 further includes a cloud device or refuse service manager, shown as service manager 60 (e.g., a cloud server, a cloud device, a cloud controller, etc.) configured to store and process data. The service manager 60 may store data and manage the flow of information throughout the system 10. By way of example, the service manager 60 may track (e.g., retrieve and store) the current location of the refuse collection drones 20, the current amount of refuse in the refuse depot 30, the amount and/or type of refuse collected from each customer, the locations of each customer, or other information.

The service manager 60 may control operation of the refuse collection drones 20, the refuse depot 30, the refuse vehicle 40, and/or the user devices 50. By way of example, in response to receiving a request for refuse collection from a user device 50 of a customer, the service manager 60 may select one of the refuse collection drones 20 and command the selected drone to navigate to the location of the customer. By way of another example, the service manager 60 may command the refuse depot 30 to unload refuse from one of the refuse collection drones 20. By way of another example, the service manager may request for the refuse vehicle to unload refuse from the refuse depot 30.

The components of the system 10 (e.g., the refuse collection drones 20, the refuse depot 30, the refuse vehicle 40, the user devices 50, the connected devices 52, and/or the service manager 60) may communicate with one another directly and/or across a network 70 (e.g., a cellular network, the Internet, etc.). In some embodiments, the components of the system 10 communicate wirelessly. By way of example, the system 10 may utilize a cellular network, Bluetooth, near field communication (NFC), infrared communication, radio, or other types of wireless communication. In other embodiments, the system 10 utilizes wired communication.

Figure 2A:
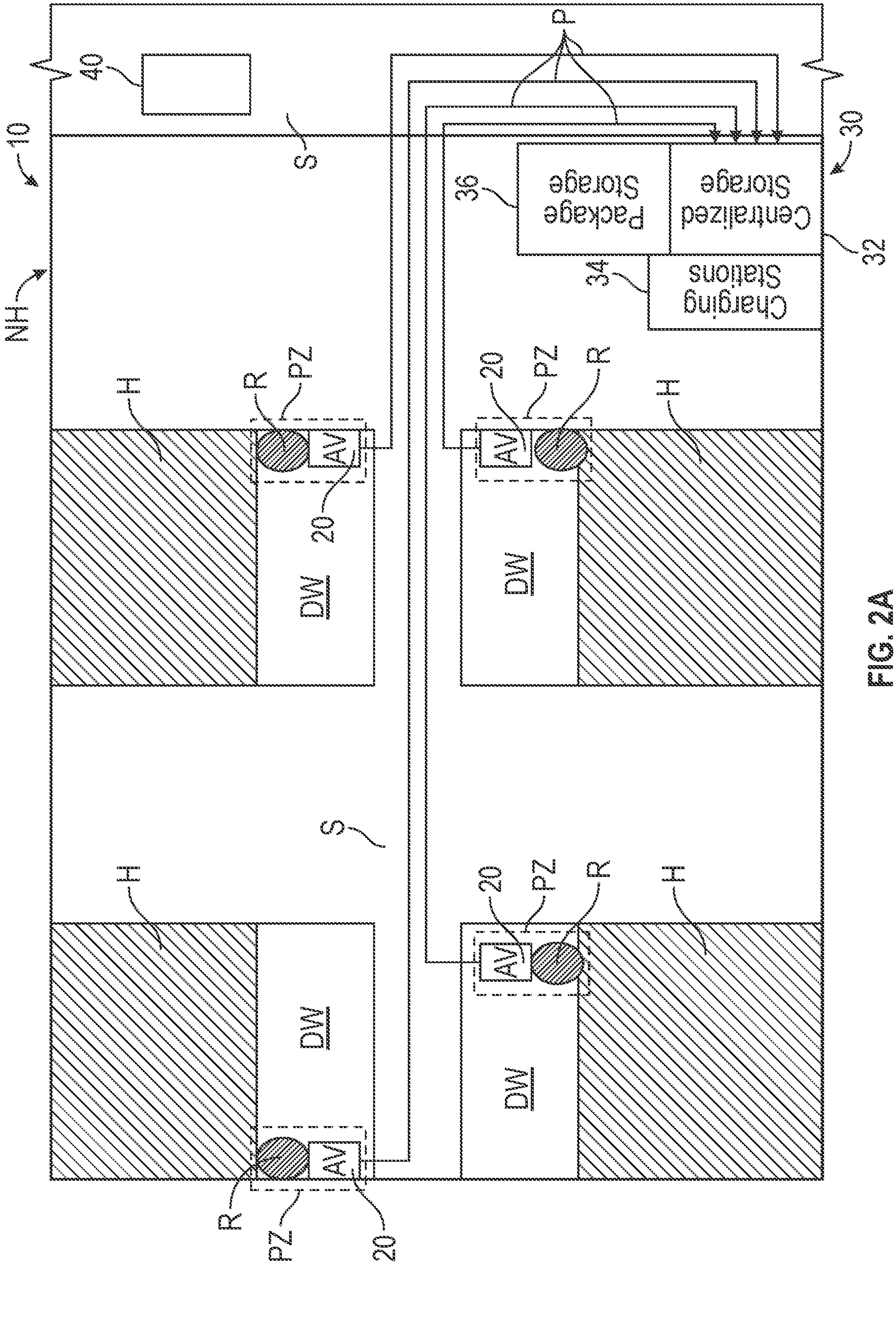
FIG. 2A is a plan view of an implementation of the refuse collection system of FIG. 1 within a residential neighborhood.

Referring to FIG. 2A, an exemplary application of the system 10 is illustrated. Specifically, in FIG. 2A the system 10 is applied to collect refuse from a grouping or cluster of buildings, shown as residential neighborhood NH. FIG. 2A may represent an outdoor application of the system 10. The neighborhood NH includes a series of structures, shown as houses H. Each house H is associated with a customer that receives refuse collection service from the system 10. The customer may bring a payload of refuse R within a pickup zone PZ, and the refuse collection drones 20 travel to the pickup zones PZ to retrieve the refuse R.

The refuse depot 30 may be positioned within or nearby the neighborhood NH to facilitate a rapid transit of the refuse collection drones 20 between the houses H and the refuse depot 30. By arranging the refuse depot 30 in this way, the response time of a refuse collection drone 20 to a request for refuse collection service may be reduced. Additionally, the energy required by the refuse collection drones 20 to travel between the refuse depot 30 and a house H may be reduced. The refuse depot 30 may be immobile such that the refuse depot 30 has a predetermined, fixed location relative to the neighborhood NH.

In some embodiments, the refuse depot 30 is connected to the houses H by one or more pathways, shown as streets S. The refuse collection drones 20 travel along paths P that are defined along the streets S. The streets S may be designated (e.g., by a municipality or other organization) for use by other types of traffic (e.g., as a road, street, highway, bicycle path, sidewalk, etc.). Accordingly, the streets S may be shared between the refuse collection drones and cars, trucks, bicycles, pedestrians, or other types of traffic. In some embodiments, the refuse vehicles 40 also travel along the streets S. In other embodiments, the paths P of the refuse collection drones 20 extend along paths that are designated for use exclusively by the refuse collection drones 20. In some embodiments, the pickup zones PZ are positioned in an area, such as a driveway DW, that can be accessed directly by the refuse collection drones 20 from the streets S (e.g., without having to travel offroad or along an unpaved path).

As shown in FIG. 2A, the refuse depot 30 includes a centralized storage 32 (e.g., a dumpster) for temporarily holding refuse collected by the refuse collection drones 20. The centralized storage 32 and/or the refuse collection drones 20 may include a transfer mechanism for transferring refuse from the refuse collection drones 20 to the centralized storage 32. The centralized storage 32 is sized to contain a large volume of refuse (e.g., a greater volume of refuse than the capacity of each refuse collection drone 20). In this way, the refuse collection drones 20 may be emptied into the centralized storage 32 several times before the centralized storage 32 is filled. The centralized storage 32 may include one or more separate volumes for collecting refuse. By way of example, the centralized storage 32 may include a first storage volume for recyclable refuse, a second storage volume for non-recyclable refuse, and a third storage volume for compostable refuse. Each storage volume may be individually removable (e.g., configured as separate dumpsters) to facilitate the refuse vehicle 40 separately emptying each storage volume as necessary.

The refuse depot 30 further includes one or more power transfer assemblies, shown as charging stations 34. The charging stations 34 may be configured to transfer energy (e.g., electrical energy, etc.) to the refuse collection drones 20. When idle and/or when transferring refuse to the centralized storage 32, the refuse collection drones 20 may interface with the charging stations 34 to recharge the onboard energy storage devices.

The refuse depot 30 may include a cargo storage area, shown as package storage 36. The package storage 36 may contain, store or otherwise house packages or other cargo intended for delivery by the refuse collection drones 20 to one or more customers. The refuse depot 30 may include a structure for placing the packages into the refuse collection drones 20. Accordingly, the system 10 may be a multi-functional system that is capable of transporting packages to customers and retrieving refuse from the customers.

Figure 3:
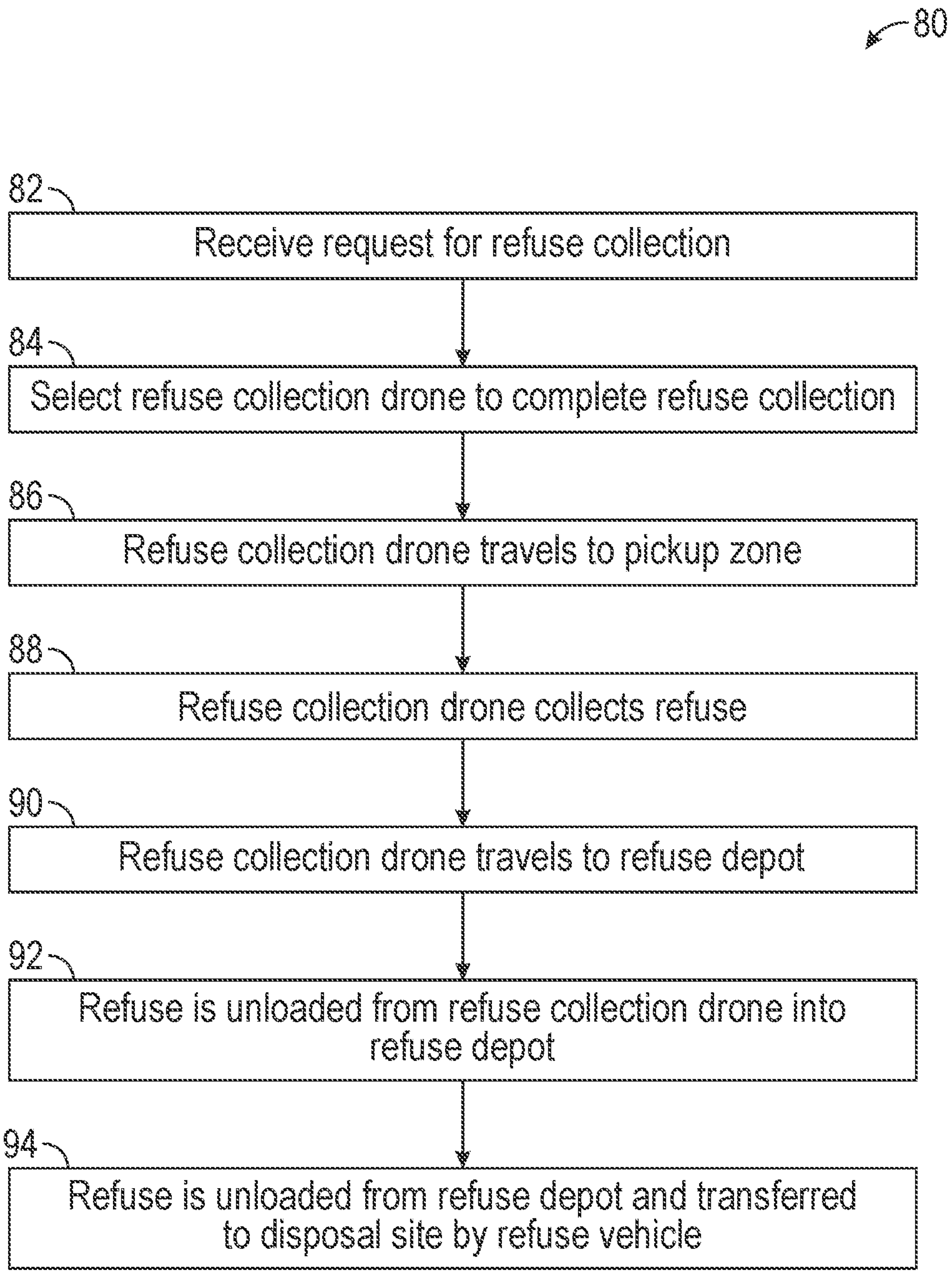
FIG. 3 is a block diagram of a method for collecting refuse to be performed by the refuse collection system of FIG. 1.

FIG. 3 illustrates a method 80 of collecting refuse that is performed by the system 10 within the area of FIG. 2A. In step 82 of the method 80, the system receives a request for refuse collection. A customer may request a refuse collection service through a user device 50. Based on information included in the request, the service manager 60 may identify a location of a pickup zone PZ associated with the customer (e.g., an address of a house H associated with the customer, a specific area adjacent the house H, etc.). The location of the pickup zone PZ may be contained within the request or determined based on the identity of the customer. The customer may initiate the request for refuse collection service at any time of day and as frequently as they desire. Alternatively, the request may be initiated according to a predetermined schedule (e.g., weekly biweekly, monthly, etc.).

In step 84, a refuse collection drone 20 is selected for completing the refuse collection. The service manager 60 may select a refuse collection drone 20 that is available at the time of the request based on various factors. By way of example, the service manager 60 may review the status of each refuse collection drone 20 to determine which refuse collection drones are eligible for selection (e.g., not currently occupied or experiencing an error). The service manager 60 may review the location of each eligible refuse collection drone 20 and select the refuse collection drone 20 that is capable of arriving at the pickup zone PZ first. By selecting this refuse collection drone 20, the system 10 minimizes the amount of time that the customer is required to wait for refuse collection.

In step 86, the selected refuse collection drone 20 travels to the pickup zone PZ associated with the customer. The service manager 60 may provide the refuse collection drone with a drone route including navigation instructions that direct the refuse collection drone 20 to follow a path P to the pickup zone PZ. The service manager 60 may adjust the path P to account for any obstructions or changes in the location of the pickup zone PZ. By way of example, the pickup zone PZ may be defined based on the current location of a user device 50, such that the path P is adjusted based on movement of the user device 50.

In step 88, the refuse collection drone 20 collects the refuse provided by the customer. Specifically, upon arrival of the refuse collection drone 20 at the pickup zone PZ, the customer may place the refuse into the refuse collection drone 20. The refuse collection drone 20 may detect the placement of the refuse into the refuse collection drone using one or more sensors (e.g., a weight sensor that detects the added weight of the refuse). Additionally or alternatively, the customer may indicate that all of the refuse has been added to the refuse collection drone 20 through an interaction with the user device 50.

In step 90, the refuse collection drone 20 travels to the refuse depot 30. The drone route provided by the service manager 60 may include navigation instructions that guide the refuse collection drone 20 to the refuse depot 30. The navigation instructions may cause the refuse collection drone 20 to follow part or all of the path P used to navigate to the pickup zone PZ.

In step 92, refuse is unloaded from the refuse collection drone 20 into the centralized storage of the refuse depot 30. The refuse may be unloaded by the refuse collection drone 20 and/or by the refuse depot 30. By way of example, the refuse depot 30 may lift and invert the refuse collection drone 20 to dump refuse from the refuse collection drone 20 into the centralized storage 32. At this point, the refuse collection drone 20 may engage the charging station 34 to recharge or proceed to collect refuse from another customer.

The service manager 60 may record time and date of the refuse collection event as well as the type and amount of refuse collected (e.g., as measured by sensors in the refuse collection drones 20 and/or the refuse depot 30). The service manager 60 may then bill the customer based on their particular level of usage of the system 10 (e.g., charging based on the number of refuse collection events, the time at which the refuse collection event occurred, the type of refuse collected, the amount of refuse collected, etc.).

This refuse collection process of steps 82-92 may be repeated several times and by multiple refuse collection drones 20 until the centralized storage 32 is filled. In step 94, the refuse from the centralized storage 32 is unloaded from the refuse depot 30 into the refuse vehicle 40, and the refuse vehicle 40 transfers the unloaded refuse to a disposal site. The system may include many refuse depots 30 and many refuse vehicles 40. Each refuse depot 30 may be associated with a different group of refuse collection drones 20. Each refuse vehicle 40 may retrieve refuse from several refuse depots 30.

Figure 2B:
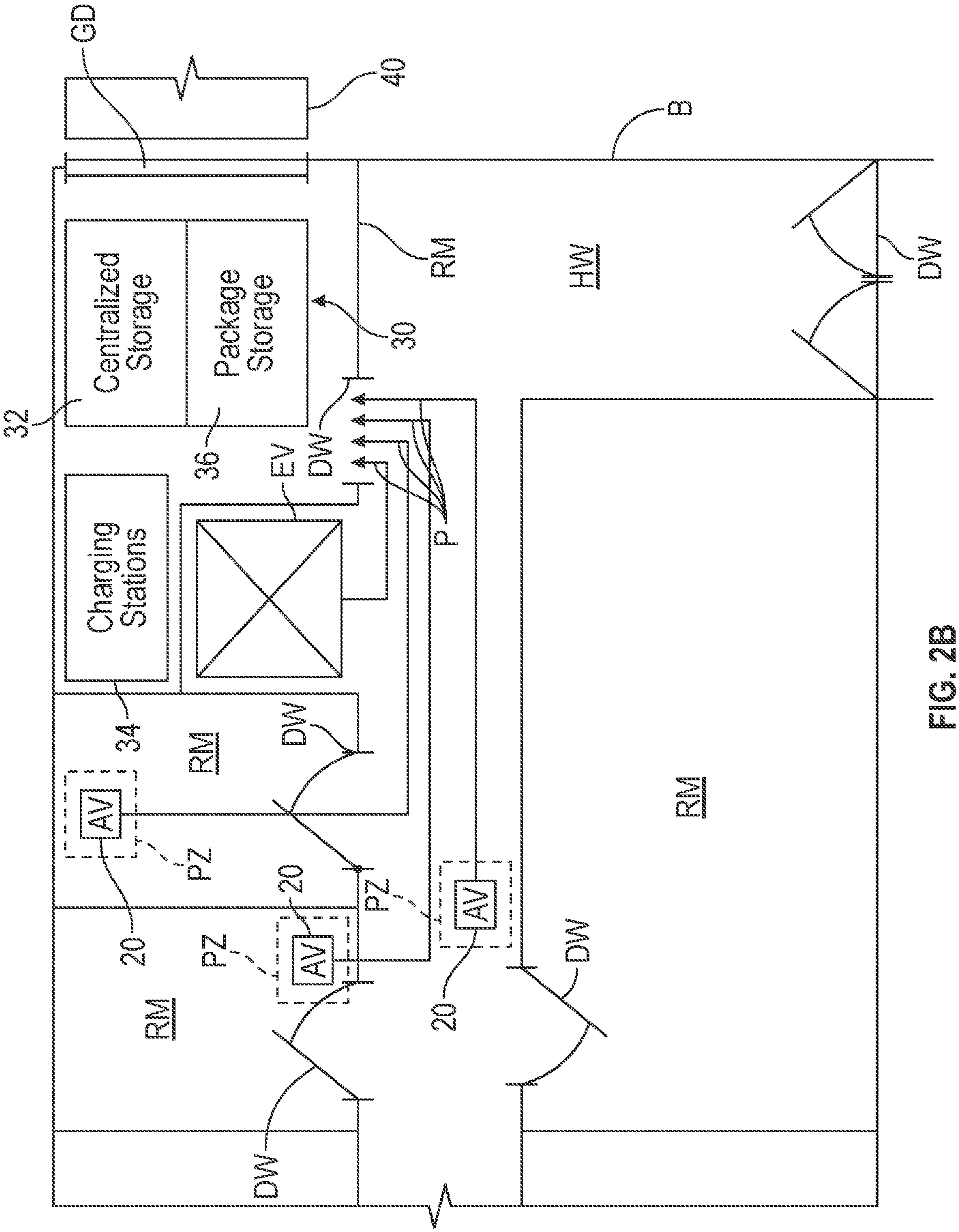
FIG. 2B is a plan view of an implementation of the refuse collection system of FIG. 1 within a building.

Although FIG. 2A illustrates an outdoor application of the system 10, the system 10 may operate similarly in an indoor environment. FIG. 2B illustrates the system 10 being used within a structure, shown as building B. The system 10 may operate exclusively within the building B or include components that are positioned outside the building B or move outside the building B during operation. By way of example, the system 10 may move between two buildings to collect refuse from both buildings.

As shown in FIG. 2B, the building B includes a series of rooms RM that are interconnected by one or more hallways HW. The walls of each room RM may define one or more doorways DW that connect the hallway HW to each room RM, permitting the refuse collection drones 20 to pass between a room RM and a hallway HW. The building B may additionally or alternatively include one or more exterior doorways DW that permit into or egress from the building B. One or more of the rooms RM may have an associated user (e.g., an occupant of the room RM) and an associated pickup zone PZ. The pickup zone PZ may be within the room RM or adjacent the room RM in the hallway HW.

As shown, the building B includes an elevator EV that permits the refuse collection drones 20 to pass between different floors of the building B. The refuse collection drones 20 may include an interface (e.g., an arm capable of pressing buttons in the elevator EV, the communication interface 250 that wirelessly transmits commands, etc.) that permits the refuse collection drone 20 command the elevator EV (e.g., to open or close elevator doors, to move to a desired floor, etc.).

As shown in FIG. 2B, one of the rooms RM contains the refuse depot 30. To facilitate emptying the centralized storage 32, the building B may include a specialized doorway, shown as garage door GD, that permits exterior access to the room RM containing the refuse depot 30. By way of example, the garage door GD may be opened to permit a refuse vehicle RV to directly access the storage centralized storage 32. The refuse vehicle may engage with the centralized storage 32 (e.g., using a pair of forks), remove the centralized storage 32 from the room RM, empty the centralized storage 32, and/or replace the centralized storage 32 back in the room RM.

By way of example, the system 10 may be utilized on a college campus, and the building B may be a classroom building or apartment building (e.g., a student dorm). By way of another example, the building B may be a hospital, an apartment building, a condominium complex, an office building, The refuse collection drones 20 may be capable of navigating through apartment buildings and classroom buildings to reach the pickup locations identified by users. A refuse collection drone 20 may start at a charging station 34 outside of an apartment building. A customer may request a pickup at a certain apartment number in one of the buildings. The refuse collection drone 20 may navigate into the building through a doorway DW, through the building (e.g., through hallways HW, along stairs, within an elevator, etc.), and to the desired apartment. The customer may open the door to the apartment and load refuse into the refuse collection drone 20, at which point the refuse collection drone 20 may exit the building.

The system 10 offers several advantages over other refuse collection systems. By way of example, a refuse collection may be initiated whenever the customer desires (i.e., on demand). The refuse collection may occur regardless of the time of day (e.g., at night) and as frequently or infrequently as the customer desires. By not operating on a fixed schedule, the system 10 can avoid unnecessary travel to a customer's home if they have not produced sufficient a sufficient volume of refuse to justify a refuse collection event. The customer can be charged based on the amount of refuse that they produce (e.g., a customer that produces less refuse can be charged less, and a customer that produces more refuse can be charged more). The system 10 reduces the manpower required to collect refuse, as refuse can be collected from the customer autonomously. Additionally, the system 10 provides an operator of the refuse vehicle 40 with flexibility, as the refuse can be collected at the refuse depot 30 for an extended period of time and emptied whenever is most convenient for the operator of the refuse vehicle 40.

The system 10 may be flexible to facilitate use in a variety of different applications of a variety of different sizes. The system 10 may include as many refuse collection drones 20, refuse depots 30, and refuse vehicles 40 as necessary to scale to the demands of a particular region. As the demands of certain areas within the region change over time, refuse collection drones 20 and/or refuse vehicles 40 may be reassigned to different refuse depots 30 within the region. Additionally or alternatively, refuse depots 30 may be relocated as desired. Should the demands of the region grow, more refuse collection drones 20, refuse depots 30, and/or refuse vehicles 40 may be added.

Refuse Collection Drones

Figure 4:
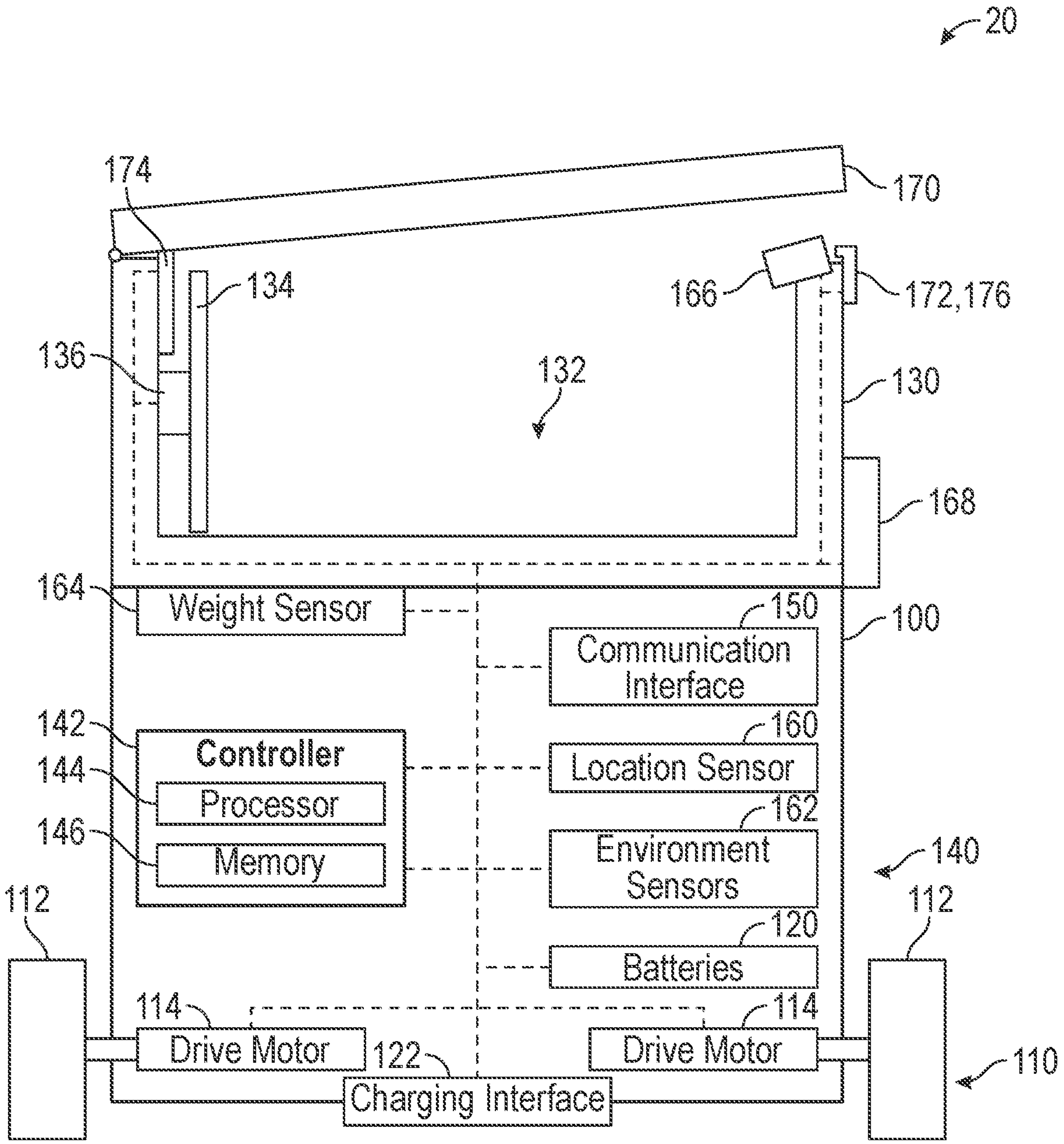
FIG. 4 is a block diagram of a refuse collection drone of the refuse collection system of FIG. 1, according to an exemplary embodiment.

Referring to FIG. 4, a refuse collection drone 20 is shown according to an exemplary embodiment. The refuse collection drone 20 includes a frame, housing, or chassis, shown as chassis 100, that supports the other components of the refuse collection drone 20. The chassis 100 may include one or more components (e.g., frame members, housings, etc.) coupled to one another to form the chassis 100.

The refuse collection drone 20 further includes drivetrain, shown as a propulsion system 110, that is configured to propel the refuse collection drone 20. The propulsion system 110 includes one or more tractive elements, shown as wheels 112, rotatably coupled to the chassis 100. The wheels 112 are configured to engage a support surface (e.g., the ground) to support the refuse collection drone 20. The propulsion system 110 includes one or more actuators (e.g., electric motors), shown as drive motors 114, coupled to the chassis 100. Each drive motor 114 is coupled to one or more of the wheels 112 and configured to drive movement of one or more of the wheels 112. In some embodiments, a first drive motor 114 is coupled to the wheels 112 on a left side of the chassis 100, and a second drive motor 114 is coupled to the wheels 112 on a right side of the chassis 100. In such embodiments, the drive motors 114 can drive the wheels 112 on the left and right sides of the chassis 100 independently to facilitate steering of the refuse collection drone 20.

The refuse collection drone 20 further includes one or more energy storage devices, shown as batteries 120, coupled to the chassis 100. The batteries 120 may store energy to power the systems of the refuse collection drone 20. The batteries 120 may be electrically coupled to one or more systems of the refuse collection drone 20 (e.g., the drive motors 114, the packing actuator 136, etc.) to supply the stored electrical energy. In other embodiments, the refuse collection drone 20 is otherwise powered, and the refuse collection drone 20 includes a different type of energy storage device. By way of example, the refuse collection drone 20 may be powered by a hydrogen fuel cell, and the energy storage device may be a tank of hydrogen. By way of another example, the refuse collection drone 20 may be powered by an internal combustion engine, and the energy storage device may be a fuel tank.

The refuse collection drone 20 further includes an energy transfer interface, shown as charging interface 122, coupled to the chassis 100. The charging interface 122 is configured to transfer electrical energy into and/or out of the refuse collection drone 20 (e.g., between the refuse collection drone 20 and the charging stations 34 of the refuse depot 30). The charging interface 122 may supply electrical energy to charge the batteries 120. In some embodiments, the charging interface 122 transfers energy wirelessly. In such embodiments, the charging interface 122 may include a wireless energy transfer coil to transfer energy through induction. In some embodiments, the charging interface 122 is configured to transfer electrical energy through a wired connection. In such embodiments, the charging interface 122 may include a set of electrical contacts positioned to engage a set of external electrical contacts.

Referring still to FIG. 4, the refuse collection drone 20 further includes a refuse container or basket, shown as bin 130. The bin 130 defines a storage volume 132 (e.g., a space, a containing space, a refuse storage volume, a drone storage volume, etc.) for containing a payload of refuse (e.g., received from a customer). The refuse may be completely contained within the storage volume 132, or the refuse may extend beyond the storage volume 132 (e.g., overflow the bin 130). The bin 130 is coupled to the chassis 100. In some embodiments, the bin 130 is removably coupled to the chassis 100 to facilitate lifting and dumping the bin 130 without having to lift the rest of the refuse collection drone 20. By making the bin 130 removable, the bin 130 can easily be transported to a different location for cleaning or replaced if damaged. The bin 130 and the storage volume 132 may be sized to receive a single kitchen garbage bag, or a single garbage bag of a garbage can. For example, the storage volume 132 may be sized to receive a discrete number of kitchen garbage bags (e.g., a single kitchen garbage bag, two kitchen garbage bags, etc.) having a size of approximately 12 to 20 gallons. Similarly, the storage volume 132 may be sized to receive a discrete number of smaller sized kitchen garbage bags such as 7 to 10 gallon bags, or 4 gallon bags. The storage volume 132 may also be sized to receive a single or multiple garbage can bags having a capacity of 20 to 30 gallons.

In some embodiments, the refuse collection drone 20 includes a compactor including a packing element, shown as pack panel 134, and an actuator (e.g., a hydraulic cylinder, an electric linear actuator, etc.), shown as packing actuator 136. The pack panel 134 partially defines the storage volume 132. The packing actuator 136 is coupled to the bin 130 and the pack panel 134 and configured to move the pack panel 134 relative to the bin 130. The packing actuator 136 may be operatively coupled to the components of the chassis 100 (e.g., the batteries 120) to facilitate operation of the packing actuator 136. By moving the pack panel 134 relative to the bin 130, the packing actuator 136 reduces the volume of the storage volume 132, compressing and compacting the refuse. Accordingly, the compactor facilitates storing a larger amount of refuse within the storage volume 132. In some embodiments, the refuse collection drone 20 additionally or alternatively includes a shredder that shreds the refuse placed within the bin 130. By shredding the refuse, the packing actuator 136 can pack the refuse even more densely. Additionally, the shredder may help to maintain customer privacy when transporting sensitive refuse.

The refuse collection drone 20 further includes a control system 140 including a controller 142 that controls operation of the refuse collection drone 20. The controller 142 is operatively coupled to the drive motor 114 and the packing actuator 136. The controller 142 includes a processing circuit, shown as processor 144, and a memory device, shown as memory 146. The memory 146 may contain one or more instructions that, when executed by the processor 144, cause the controller 142 to perform the processes described herein. While some processes may be described as being performed by the controller 142, it should be understood that those processes may be performed by any other controller of the system 10 or distributed across multiple controllers of the system 10. The controller 142 may control the drive motors 114 to navigate (e.g., between the pickup zones PZ and the refuse depot 30) as instructed by the service manager 60. In some embodiments, the controller 142 navigates the refuse collection drone 20 autonomously (e.g., without any directional control by a user).

The control system 140 further includes a network interface, shown as communication interface 150, operatively coupled to the controller 142. The communication interface 150 is configured to transfer data between the refuse collection drone 20 and other components of the system 10 (e.g., other refuse collection drones 20, the refuse depot 30, the refuse vehicle 40, the user devices 50, the service manager 60, the network 70, etc.). The communication interface 150 may facilitate wired and/or wireless communication.

The control system 140 further includes one or more position, velocity, and/or acceleration sensors, shown as location sensor 160, operatively coupled to the controller 142. The location sensor 160 is configured to provide location data relating to the current location of the refuse collection drone 20. By way of example, the location sensor 160 may include a global positioning system (GPS) that provides the current location of the refuse collection drone 20 relative to the Earth. By way of another example, the location sensor 160 may include one or more accelerometers and/or gyroscopes that track movement of the refuse collection drone 20. The controller 142 may utilize the location data to navigate to a pickup location.

The control system 140 further includes one or more environment sensors 162 operatively coupled to the controller 142. The environment sensors 162 are configured to provide environment data relating to the environment surrounding the refuse collection drone 20. By way of example, the environment sensors 162 may include cameras, LiDAR sensors, light sensors, switches that detect contact with other objects, or other types of sensors that provide environment data. The controller 142 may utilize the environment data to identify objects in the surrounding environment and facilitate navigation. By way of example, the controller 142 may use the environment data to identify and avoid one or more obstacles in the surrounding environment. By way of another example, the controller 142 may use the environment data to identify the pickup zone and drive toward the pickup zone. By way of another example, the controller 142 may use the environment data to identify and navigate along a street or other path.

The control system 140 further includes one or more refuse amount sensors or refuse position sensors, shown as weight sensor 164, operatively coupled to the controller 142. The weight sensor 164 is configured to provide refuse amount data (e.g., weight data) relating to the amount of refuse loaded into the storage volume 132. By way of example, the weight sensor 164 may measure the change in weight supported by the bin 130 over time. The controller 142 may use the weight data to determine the amount (e.g., weight) of refuse loaded by a customer. Accordingly, the weight data may be used (e.g., by the service manager 60) to determine how much to charge the customer for a refuse collection event (e.g., to generate the billing data 540). In some embodiments, the control system 140 includes multiple weight sensors 164 positioned at various predetermined locations throughout the storage volume. By comparing the weights supported by each of the weight sensors 164, the controller 142 may determine the weight distribution (e.g., the position of the center of gravity) of the refuse within the storage volume 132.

The control system 140 further includes one or more refuse type sensors or refuse position sensors, shown as camera 166, operatively coupled to the controller 142. The camera 166 is configured to provide refuse type data relating to the type of refuse loaded into the storage volume 132. As shown, the camera 166 faces toward the storage volume 132, such that the camera 166 records image data of the refuse within the storage volume 132. The controller 142 may analyze the image data to determine the type of refuse (e.g., glass, plastic, metal, electronics, food waste, yard waste, etc.) and if the refuse falls under a certain type of category (e.g., non-recyclable, recyclable, compostable, mixed, etc.). By way of example, the controller 142 may perform image recognition (e.g., using artificial intelligence). The controller 142 may use the refuse type data to determine how the refuse should be disposed (e.g., recycled, landfilled, burned, composted, etc.) and determine an associated designation for the refuse. The controller 142 may use the refuse type data to determine how much to charge the customer for a refuse collection event (e.g., charging more for certain categories of refuse, providing a credit for recycling metals, etc.).

The camera 166 may additionally be used to provide refuse position data indicating the amount and distribution of refuse within and/or nearby the storage volume 132. By performing image recognition on the image data from the camera 166, the controller 142 may identify which areas of the storage volume 132 contain refuse. Based on this analysis, the controller 142 may determine the remaining available capacity of the storage volume 132. The image data from the camera 166 may also indicate if any of the refuse extends beyond the storage volume 132, indicating that bin 130 has been overfilled. In other embodiments, another type of sensor is utilized to determine if the refuse extends beyond the storage volume 132, such as a break beam sensor.

The control system 140 further includes a user interface or customer-facing interface, shown as customer display 168, operatively coupled to the controller 142. The customer display 168 may include one or more output devices (e.g., display, speakers, haptic feedback devices, lights, projectors, etc.). In some embodiments, the customer display 168 includes one or more input devices (e.g., buttons, touch screens, microphones, etc.). The controller 142 may control the customer display 168 to provide information to a user (e.g., the customer). By way of example, the controller 142 may control the customer display 168 to provide commands, instructions, or other information to the customer (e.g., "please wait," "place your refuse within the bin," "close the lid," etc.). The controller 142 may control the customer display 168 to indicate a current status of the refuse collection drone 20 (e.g., "traveling to customer," "returning from customer," "charging needed," "error—awaiting service," etc.). Any messages or other information provided by the customer display 168 may additionally or alternatively be provided to the customer through a user device 50 associated with the customer.

The refuse collection drone 20 includes a lid, shown as cover 170, rotatably coupled to the bin 130. The cover 170 is selectively repositionable between a closed position, shown in FIG. 5, and an open position. In the closed position, the cover 170 extends across the top of the storage volume 132, preventing refuse from entering or exiting the storage volume 132. The closed position may be useful to prevent material flying out of the bin 130 during transit. In the open position, the cover 170 permits refuse to enter and exit the storage volume 132. The cover 170 may be repositioned into the open position by lifting the cover 170 or inverting the bin 130.

The control system 140 further includes a position sensor, shown as closure sensor 172, operatively coupled to the controller 142. The closure sensor 172 may indicate whether or not the cover 170 is fully closed. By way of example, the closure sensor 172 may include a limit switch positioned to contact the cover 170 when the cover 170 is fully closed.

The control system 140 further includes an actuator, shown as cover actuator 174, operatively coupled to the controller 142. The cover actuator 174 is coupled to the bin 130 and configured to apply an upward force on the cover 170 to lift or otherwise move the cover 170 toward the open position. The cover actuator 174 may be used to automatically open the cover 170 when the refuse collection drone 20 is ready to receive refuse. Similarly, the cover actuator 174 may be used to automatically close the cover 170 when the refuse collection drone 20 is in transit or otherwise not ready to receive refuse.

The control system 140 further includes a security device, movement restrictor, or cover control, shown as lock 176, that selectively limits (e.g., prevents) movement of the cover 170. By securing the cover 170 in place, the lock 176 may prevent unauthorized addition or removal of items (e.g., refuse, packages, etc.) from the storage volume 132. By way of example, with the lock 176 in a disengaged configuration, the cover 170 may be permitted to move freely between the closed position and the open position. In an engaged configuration, the lock 176 may prevent the cover 170 from leaving the closed position. The lock 176 may include a clasp, hook, or pawl that engages the cover 170 in the engaged configuration to prevent the movement of the cover 170. Additionally or alternatively, the cover actuator 174 may act as the lock 176. By way of example, the cover actuator 174 may oppose external forces on the cover 170 to limit movement of the cover 170. The lock 176 may be transitionable between a locked state in which movement of the cover 170 is prevented or limited, and an unlocked state in which movement of the cover 170 is allowed.

In some embodiments, the refuse collection drone 20 is configured to monitor the accumulation of refuse within the storage volume 132 and determine if the refuse is likely to cause an instability condition (e.g., cause the refuse collection drone 20 to tip). If heavy objects are positioned at a sufficient elevation within the storage volume 132, the overall center of gravity of the refuse collection drone 20 and the refuse may be elevated, reducing the stability of the refuse collection drone 20. The controller 142 may utilize one or more weight sensors 164 to determine the effect of the refuse on the position of the center of gravity. Additionally or alternatively, the controller 142 may utilize image data from the camera 166 to determine if the refuse is likely to cause an instability condition. By way of example, the controller 142 may use the image data to determine the height of the refuse within the refuse compartment. The controller 142 may perform image recognition to identify the addition of items known to be dense or heavy (e.g., appliances, containers of liquid, wood, etc.). The controller 142 may verify such an identification using the weight sensors 164. Based on the weight of the refuse and the vertical position at which the refuse is placed, the controller 142 may predict if the refuse is likely to cause an instability condition. Additionally or alternatively, the controller 142 may detect an instability condition while the refuse collection drone 20 is traveling using the location sensors 160 and/or the environment sensors 162. By way of example, the controller 142 may use a gyroscope to determine if the refuse collection drone 20 is close to tipping.

In response to detecting or predicting an instability condition, the controller 142 may limit operation of the refuse collection drone 20 until the instability condition is eliminated. By way of example, the controller 142 may limit operation of the drive motors 114 (e.g., prevent operation of the drive motors 114, limit a speed of the drive motors 114, limit an acceleration of the drive motors 114, etc.). The controller 142 may control the customer display 168 to display instructions for a customer or other user to rearrange or remove the refuse to address the instability condition.

In some embodiments, the controller 142 is configured to use the image data from the camera 166 to identify forbidden items within the storage volume 132 (e.g., using image recognition as items are added to the storage volume 132). The controller 142 may store a predetermined list of such forbidden items. Forbidden items may include items that are potentially dangerous (e.g., flammable, explosive, corrosive, etc.), subject to government regulations (e.g., firearms, illegal substances, etc.), living beings (e.g., humans or animals), or otherwise undesirable to transport. Additionally or alternatively, the controller 142 may utilize other sensor data to verify the presence of a forbidden item within the storage volume 132. By way of example, fluctuations in the weight detected by the weight sensor 164 may indicate the presence of a living being in the storage volume 132. In response to detecting a forbidden item, the controller 142 may control the customer display 168 to instruct the customer to remove the forbidden item. The displayed instructions may include an image of the forbidden item (e.g., as captured using the camera 166). The controller 142 may limit operation of the drive motors 114 until the forbidden item is removed. Additionally or alternatively, the controller 142 may provide a notification to another party indicating the presence and type of forbidden item. By way of example, the controller 142 may provide the notification to the company operating the system 10. By way of another example, the controller 142 may provide the notification to a governmental body (e.g., a police department, a fire department, etc.).

In some embodiments, the controller 142 is configured to use the image data from the camera 166 to identify items within the storage volume 132 that the refuse collection drone 20 is not intended to transport (e.g., using image recognition as items are added to the storage volume 132). By way of example, if the refuse collection drone 20 is designated to collect recyclables, the controller 142 may seek to identify non-recyclable items within the storage volume 132. By way of another example, if the refuse collection drone 20 is designated to collect non-recyclables, the controller 142 may seek to identify recyclable items within the storage volume 132. In response to detecting a non-compliant item, the controller 142 may control the customer display 168 to instruct the customer to remove the identified item. The displayed instructions may include an image of the non-compliant item (e.g., as captured using the camera 166). The controller 142 may limit operation of the drive motors 114 until the identified item is removed. Alternatively, if the identified item is not removed, the refuse collection drone 20 may provide a notification to the service manager 60 indicating that a non-compliant item was added and the identity of the customer that added the item. The service manager 60 may apply a penalty (e.g., an additional charge) to the customer's to account for the added cost of sorting out the non-compliant item from the rest of the refuse at a sorting facility, thereby discouraging the customer from providing non-compliant items in the future.

In some embodiments, the controller 142 is configured to identify if the refuse extends beyond the storage volume 132. In some such embodiments, the controller 142 monitors the position of the cover 170 using the closure sensor 172. If the cover 170 is unable to close fully, this may indicate that refuse is extending outside of the storage volume 132 and blocking the cover 170 from closing. In other such embodiments, the controller 142 monitors the position of refuse using the camera 166 to determine if any part of the refuse extends outside of the storage volume 132. In other embodiments, the control system 140 includes another type of sensor, such as a break beam sensor, that detects when refuse extends beyond the storage volume 132.

In response to detecting that the refuse extends beyond the storage volume 132, the controller 142 may control the customer display 168 to instruct the customer to remove the identified item. The displayed instructions may include an image of the portion of the refuse that extends beyond the storage volume 132 (e.g., as captured using the camera 166). The controller 142 may limit operation of the drive motors 114 until the identified item is removed. The shape and size of the storage volume 132 may be predetermined, facilitating the controller 142 determining how far from other obstacles the refuse collection drone 20 must travel to avoid collisions. By fully containing the refuse within the storage volume 132, the refuse is prevented from expanding beyond the predetermined dimensions of the refuse collection drone 20 and coming into contact with outside obstacles. Automated detection of the refuse extending outside of the intended storage volume 132 may be particularly useful for refuse collection drones 20 that are intended to carry oversized items, as the bins 130 of such refuse collection drones 20 may not completely enclose the refuse during normal operation (e.g., the bin 130 may leave the refuse exposed to the surroundings).

Figure 5:
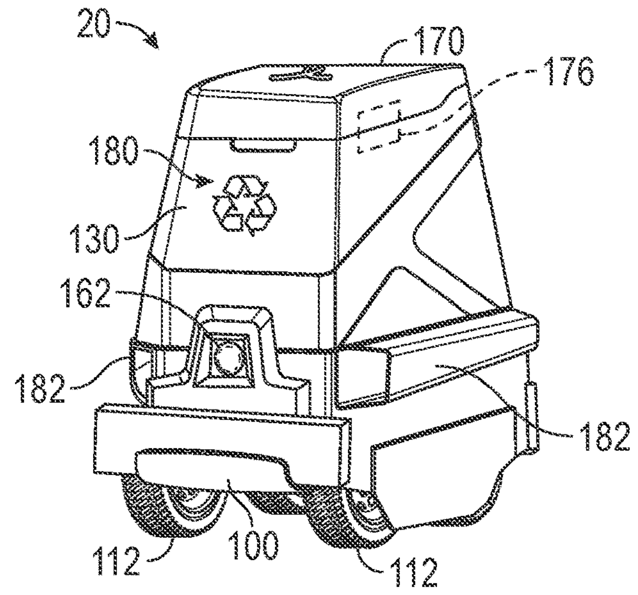
FIG. 5 is a perspective view of the refuse collection drone of FIG. 4, according to an exemplary embodiment.
Figure 6:
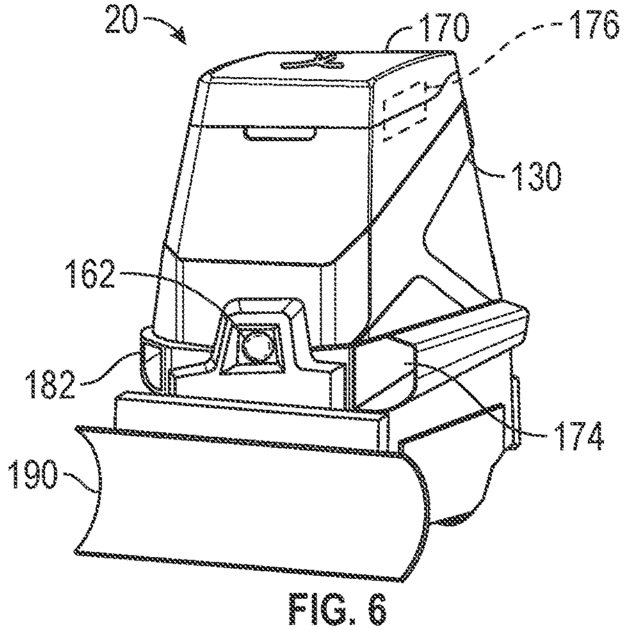
FIG. 6 is a perspective view of the refuse collection drone of FIG. 4, according to an alternative embodiment.
Figure 7:
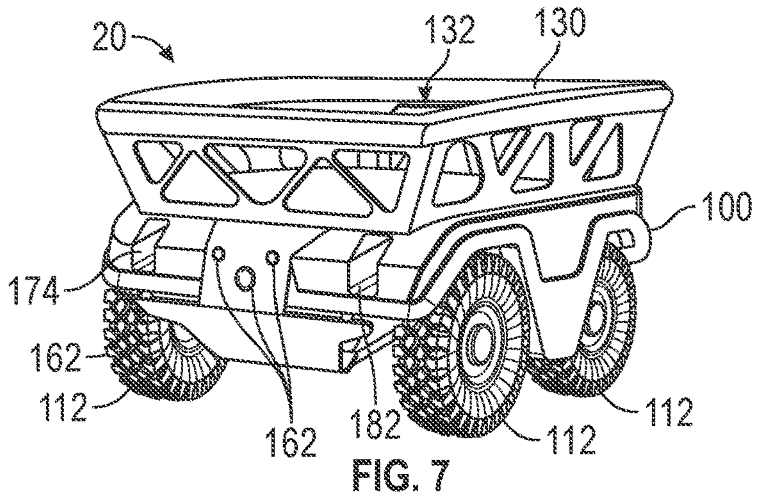
FIG. 7 is a perspective view of the refuse collection drone of FIG. 4, according to an alternative embodiment.

FIGS. 5-7 illustrate several possible variants of the refuse collection drone 20 of FIG. 4. The refuse collection drones 20 of FIGS. 5-7 may each be suited to collection of a different type of refuse. As such, the system 10 may utilize two or more of the refuse collection drones 20 of FIGS. 5-7 simultaneously.

The refuse collection drone 20 of FIG. 5 is configured for transport of relatively small recyclable refuse. The refuse collection drone 20 includes a visual indicator, shown as decal 180, that is associated with recycling and instructs the customer to load only recycling into the bin 130. The bin 130 defines a pair of interfaces, pockets, channels, voids, etc., shown as fork passages 182. The fork passages 182 are each configured to receive a fork to facilitate engagement with the bin 130 (e.g., when emptying the bin 130).

The refuse collection drone 20 of FIG. 6 may be substantially similar to the refuse collection drone 20 of FIG. 5. The refuse collection drone 20 of FIG. 6 is configured for transport of relatively small non-recyclable refuse, and thus omits the decal 180 of FIG. 5. Alternatively, the bin 130 may include a decal 180 that is associated with non-recyclable refuse and instructs the customer to load only non-recyclable refuse into the bin 130.

As shown in FIG. 6, the refuse collection drone 20 includes an implement (e.g., a brush, a salt dispenser, a lawn mowing unit, a sand dispenser, a heating element, etc.) such as a snow removal element, shown as plow 190, that is coupled to the chassis 100. The plow 190 may be utilized with any of the refuse collection drones 20 described herein. In other embodiments, the refuse collection drone 20 utilizes a different type of snow removal element, such as a snowblower. The plow 190 may be removably coupled to the chassis 100 (e.g., to reconfigure the refuse collection drone 20 into or out of a snow removal configuration). The plow 190 is positioned along a front side of the refuse collection drone 20 such that longitudinal movement of the refuse collection drone 20 (e.g., driven by the wheels 112) causes the plow 190 to scrape and push snow or other debris out of the path of the refuse collection drone 20. Using the plow 190, the refuse collection drone 20 may be used to perform snow removal (e.g., from the streets S, from the driveways DW, etc.). The snow removal capability of the refuse collection drone 20 may permit the refuse collection drone 20 to navigate after a snowfall. The refuse collection drones 20 may be used to provide a snow removal service to one or more customers.

The refuse collection drone 20 of FIG. 7 may be substantially similar to the refuse collection drone 20 of FIG. 6, except that the refuse collection drone 20 of FIG. 7 is configured for transport of relatively large refuse (e.g., oversized items that are unable to fit within the refuse collection drones 20 of FIGS. 5 and 6). The refuse collection drone 20 may omit the cover 170, such that the storage volume 132 is constantly exposed. This may be suitable for carrying large items that may be larger than the storage volume 132.

Refuse Depot

Figure 8:
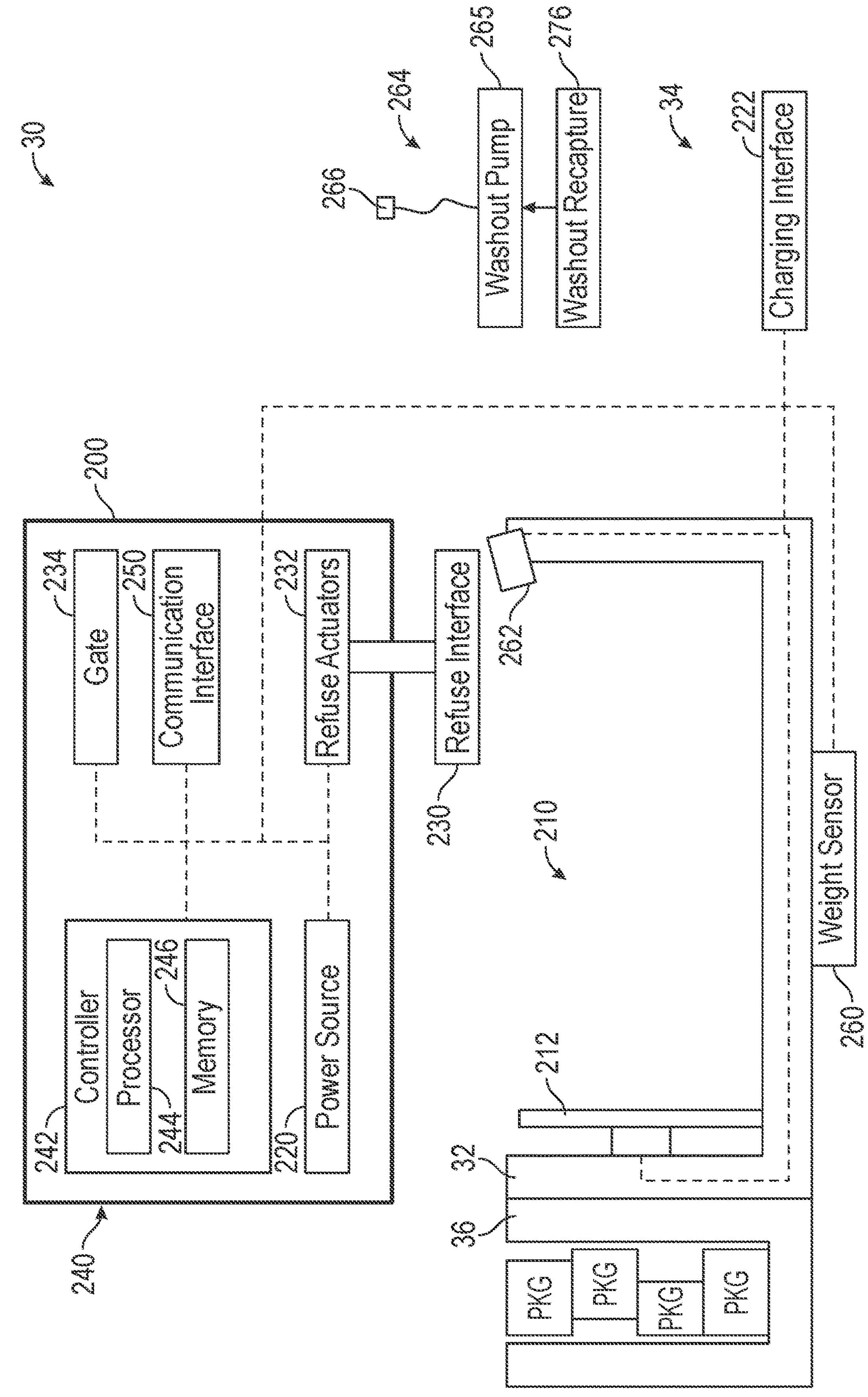
FIG. 8 is a block diagram of a refuse depot of the refuse collection system of FIG. 1, according to an exemplary embodiment.

Referring to FIG. 8, the refuse depot 30 is shown according to an exemplary embodiment. The refuse depot 30 includes a frame, housing, or chassis, shown as chassis 200, that supports the other components of the refuse depot 30. The chassis 200 may include one or more components (e.g., frame members, housings, etc.) coupled to one another to form the chassis 200. The chassis 200 may be coupled to the centralized storage 32 or separate from the centralized storage 32. The chassis 200 may be stationary, fixedly coupled to a ground surface (e.g., the ground, a foundation embedded into the ground, etc.), or otherwise incapable of moving under its own power. Accordingly, the refuse depot 30 may remain in a constant, predetermined location during normal operation.

The centralized storage 32 (e.g., a container) defines a storage volume 210 (e.g., a volume defined within walls of one or more containers) for containing refuse (e.g., received from the refuse collection drones 20). The refuse may be completely contained within the storage volume 210, or the refuse may extend beyond the storage volume 210 (e.g., overflow the bin 130). In some embodiments, the storage volume 210 of the centralized storage 32 is larger than the storage volumes 132 of the refuse collection drones 20 to facilitate storing several payloads of refuse from the refuse collection drones 20. In some embodiments, the storage volume 210 is a single, continuous volume. In other embodiments, the storage volume 210 includes two or more separate volumes. Each separate volume may be used to store a different type of refuse (e.g., recyclables, non-recyclables, compostables, etc.). By way of example, the centralized storage 32 may include several dumpsters.

In some embodiments, the refuse depot 30 includes one or more compactors including a packing element, shown as pack panel 212, and an actuator (e.g., a hydraulic cylinder, an electric linear actuator, etc.), shown as packing actuator 214. The pack panel 212 partially defines the storage volume 210. The packing actuator 214 is coupled to the centralized storage 32 and the pack panel 212 and configured to move the pack panel 212 relative to the centralized storage 32. The packing actuator 214 may be operatively coupled to the components of the chassis 200 (e.g., the power source 220) to facilitate operation of the packing actuator 214. By moving the pack panel 212 relative to the centralized storage 32, the packing actuator 214 reduces the volume of the storage volume 210, compressing and compacting the refuse. Accordingly, the compactor facilitates storing a larger amount of refuse within the storage volume 210.

The refuse depot 30 further includes a source of energy (e.g., electrical energy), shown as power source 220, coupled to the chassis 200. The power source 220 may provide energy to power the systems of the refuse depot 30. The power source 220 may provide energy from an energy storage device (e.g., batteries, capacitors, etc.) or from another source (e.g., a power grid). Additionally or alternatively, the power source 220 may include a device that generates energy (e.g., a solar panel, a fuel cell, a generator including an internal combustion engine, etc.). The power source 220 may be electrically coupled to one or more systems of the refuse depot 30 (e.g., packing actuator 214, the refuse actuators 232, etc.) to supply the electrical energy.

Each charging station 34 of the refuse depot 30 further includes an energy transfer interface, shown as charging interface 222. The charging interfaces 222 are configured to transfer electrical energy between the power source 220 and the refuse collection drones 20. The charging interfaces 222 may supply electrical energy to the refuse collection drones 20 to charge the batteries 120. In some embodiments, the charging interface 222 transfers energy wirelessly. In such embodiments, the charging interfaces 222 may include a wireless energy transfer coil to transfer energy to the charging interfaces 122 through induction. In other embodiments, the charging interfaces 222 are configured to transfer electrical energy through a wired connection. In such embodiments, the charging interface 222 may each include a set of electrical contacts positioned to engage a corresponding set of electrical contacts on a refuse collection drone 20. In some embodiments, the charging interfaces 222 are fixedly coupled to the centralized storage 32 to form the refuse depot 30.

Referring still to FIG. 8, the refuse depot 30 further includes a refuse engagement interface, grasper, scoop, collection implement, or grabber, shown as refuse interface 230. The refuse interface 230 is configured to engage (e.g., selectively couple to) refuse to facilitate moving refuse into and/or out of the centralized storage 32. By way of example, the refuse interface 230 may directly engage the refuse (e.g., with a grabber or a scoop, etc.). By way of another example, the refuse interface 230 may engage the bin 130 to move refuse contained within the bin 130. By way of another example, the refuse interface 230 may engage the centralized storage 32 to move refuse contained within the centralized storage 32.

The refuse depot 30 further includes one or more actuators, shown as refuse actuators 232, that move the refuse interface 230 to move the refuse engaged by the refuse interface 230. The refuse actuators 232 may include electric actuators (e.g., electric motors), hydraulic actuators (e.g., hydraulic cylinders), pneumatic actuators (e.g., pneumatic cylinders), or another type of actuator. The refuse actuators 232 may lift the refuse interface 230 and/or translate the refuse interface 230 horizontally. The refuse depot 30 may utilize the refuse interface 230 and the refuse actuators 232 to move refuse from the refuse collection drones 20 to the centralized storage 32, to move refuse within the centralized storage 32 (e.g., to reorganize the centralized storage 32), and/or to move refuse from the centralized storage 32 to the refuse vehicle 40.

The refuse depot 30 further includes a covering, shown as gate 234, coupled to the chassis 200. The gate 234 is configured to selectively prevent access to the storage volume 210 from outside of the refuse depot 30. Specifically, the gate 234 may be movable between a closed position, in which the gate 234 prevents access to the storage volume 210, and an open position, in which the gate 234 permits access to the storage volume 210. The gate 234 may include an actuator (e.g., an electric motor) that moves the gate between the open position and the closed position.

The refuse depot 30 further includes a control system 240 including a controller 242 that controls operation of the refuse depot 30. The controller 242 is operatively coupled to the packing actuator 214 and the refuse actuators 232. The controller 242 includes a processing circuit, shown as processor 244, and a memory device, shown as memory 246. The memory 246 may contain one or more instructions that, when executed by the processor 244, cause the controller 242 to perform the processes described herein. While some processes may be described as being performed by the controller 242, it should be understood that those processes may be performed by any other controller of the system 10 or distributed across multiple controllers of the system 10. The refuse actuators 232 and the refuse interface 230 may be configured to perform both an unloading and a loading operation. The loading operation can include grasping or selectively coupling refuse from one of the refuse drones 20 with the refuse interface 230, lifting, moving, and placing the refuse into the storage volume 210. Similarly, the loading operation can include selectively coupling a portion of the refuse drones 20 with the refuse interface 230, lifting, and emptying the refuse of the portion of the refuse drones 20 into the storage volume 210. The loading operation can include grasping a package or object from a nearby area via the refuse interface 230, and operating the refuse actuators 232 to move the refuse interface 230 to one of the refuse drones 20. The package or object may be placed in a storage volume, bin, or other support area of the refuse drones 20 for delivery of the package or object by the refuse drone 20 to a customer or target address.

The control system 240 further includes a network interface, shown as communication interface 250, operatively coupled to the controller 242. The communication interface 250 is configured to transfer data between the refuse depot 30 and other components of the system 10 (e.g., the refuse collection drones 20, the refuse vehicle 40, the user devices 50, the service manager 60, the network 70, etc.). The communication interface 250 may facilitate wired and/or wireless communication.

The control system 240 further includes one or more refuse amount sensors, shown as weight sensor 260, operatively coupled to the controller 242. The weight sensor 260 is configured to provide refuse amount data (e.g., weight data) relating to the amount of refuse loaded into the storage volume 210. By way of example, the weight sensor 260 may measure the change in weight supported by the centralized storage 32 over time. The controller 242 may use the weight data to determine the amount (e.g., weight) of refuse loaded from a refuse collection drone 20. The weight data may be used (e.g., by the service manager 60) to determine how much to charge the customer for a refuse collection event (e.g., to generate the billing data 540). Additionally or alternatively, the weight data may be used to determine the current capacity of the centralized storage 32 and determine when the centralized storage 32 should be emptied.

The control system 240 further includes one or more refuse type sensors or image sensors, shown as camera 262, operatively coupled to the controller 242. The camera 262 is configured to provide refuse layout data relating to the layout of the refuse loaded into the storage volume 210. As shown, the camera 262 faces toward the storage volume 210, such that the camera 262 records image data of the refuse within the storage volume 210. The controller 242 may analyze the image data to determine the layout of refuse within the storage volume 210 (e.g., the locations and amount of refuse within the storage volume 210. The controller 242 may use the refuse layout data to determine where to place new refuse within the storage volume 210. Additionally or alternatively, the controller 242 may analyze the image data to determine the type of refuse (e.g., glass, plastic, metal, electronics, food waste, yard waste, etc.) and if the refuse falls under a certain type of category (e.g., non-recyclable, recyclable, compostable, mixed, etc.).

The refuse depot 30 further includes a washout system 264 that is configured to provide a supply of cleaning fluid to remove debris from or otherwise clean the refuse depot 30 (e.g., the centralized storage 32) and the refuse collection drones 20 (e.g., the storage volumes 132). The cleaning fluid may include water and/or an additive (e.g., a detergent, a solvent, etc.) that facilitates removal of debris. The washout system 264 includes a pump, shown as washout pump 265, that provides a pressurized flow of the cleaning fluid to a nozzle 266. The nozzle 266 may be manually aimed by a user or automatically aimed by the control system 240 (e.g., using one or more nozzle actuators) to direct the cleaning fluid toward the area to be cleaned. The used cleaning fluid is captured by a drain system, shown as washout recapture 276. The washout recapture 276 may include a drain positioned beneath the refuse depot 30, such that the used cleaning fluid drains into the washout recapture 276. The washout recapture 276 may include a filter that separates the debris and leachate from the water. The filtered water may be supplied back to the washout pump 265 for recycled use.

In some embodiments, the refuse depot 30 is further configured to store cargo, shown as packages PKG, in the package storage 36 for delivery to one or more customers. The package storage 36 and the centralized storage 32 may both be contained within the walls 270. The packages PKG may be placed in the package storage 36 by a delivery service or postal service, with the system 10 handling the last leg of the delivery process. The refuse depot 30 may be configured to retrieve packages from the package storage 36 and place them in the storage compartments 132 of the refuse collection drones 20. By way of example, the refuse depot 30 may utilize the refuse interface 230 to extract the packages PKG from the package storage 36 and place the packages PKG in the storage compartments. A similar process may be followed in reverse (e.g., to process a product return by a customer).

In some embodiments, the controller 242 utilizes the camera 262 and/or additional cameras 262 to monitor the packages PKG. Image data from the cameras 262 may provide location data indicating the positions and orientations of packages PKG within the package storage 36. The image data may provide package attribute data, such as the shapes and sizes of the packages PKG. The image data may provide package identifier data, such as bar codes or QR codes, that identify the package. The package identifier data may include a seller or location where the package originated, a destination for the package, or other information. Using the package identifier data, the controller 242 or the service manager 60 may identify a customer associated with the package PKG.

Figure 9:
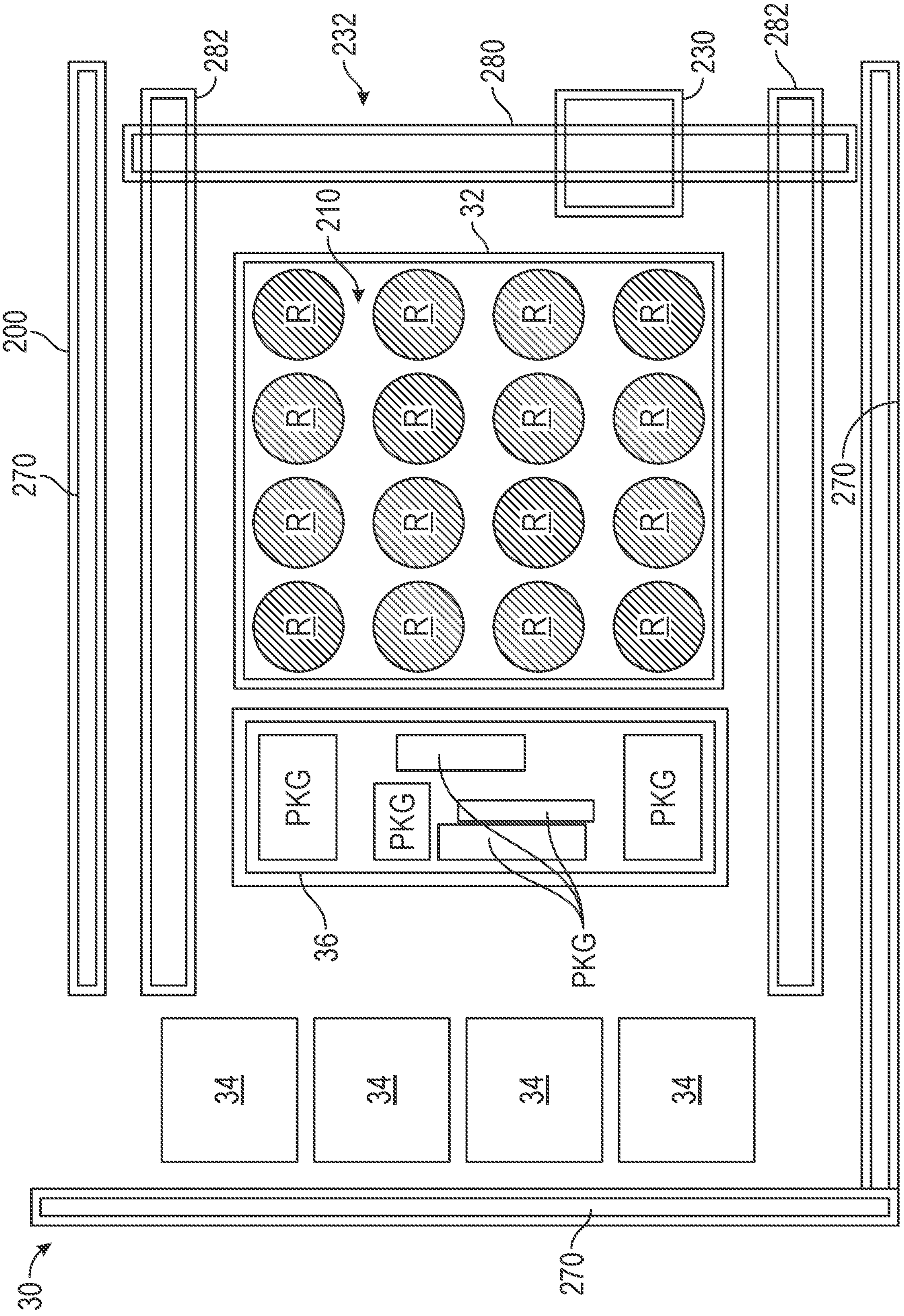
FIG. 9 is a plan view of the refuse depot of FIG. 8, according to an exemplary embodiment.
Figure 10:
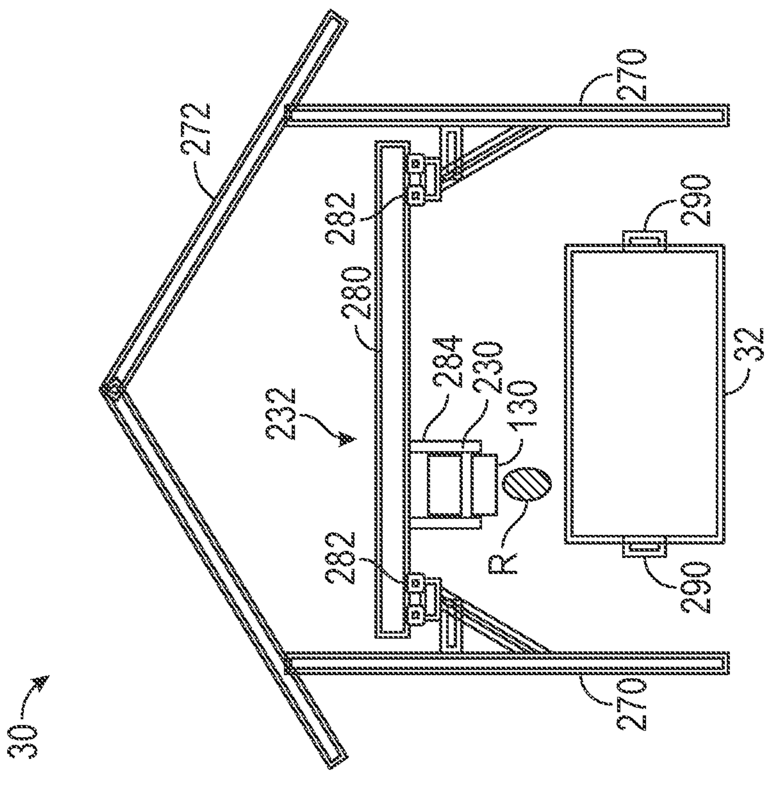
FIG. 10 is a front view of the refuse depot of FIG. 9 with a gate in an open position.
Figure 11:
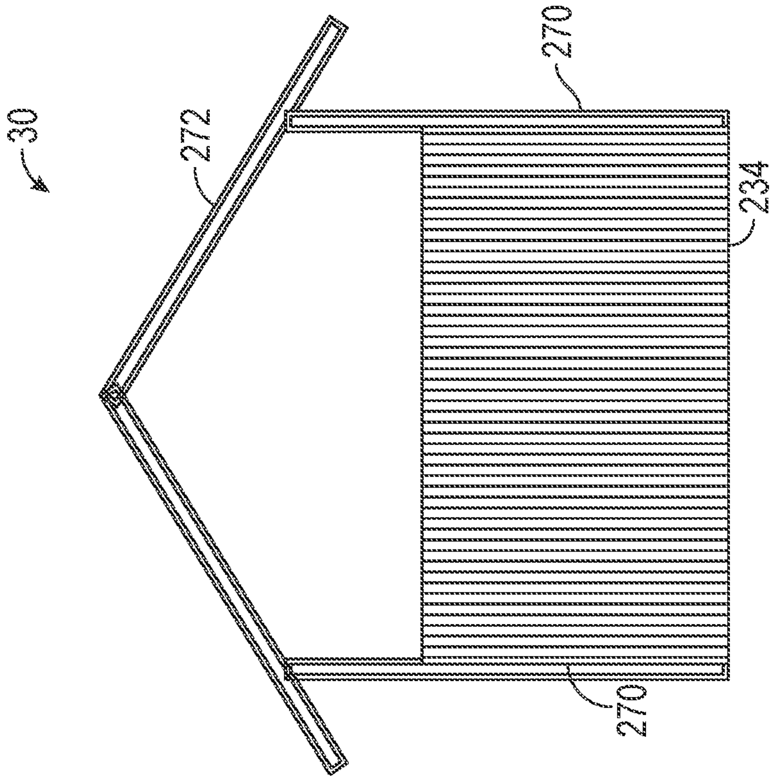
FIG. 11 is a front view of the refuse depot of FIG. 9 with the gate in a closed position.

Referring to FIGS. 9-11, the refuse depot 30 is shown according to an exemplary embodiment. In the embodiment of FIGS. 9-11, the chassis 200 is an enclosure including a series of walls 270 and a roof 272. The walls 270 support the roof 272 such that the roof 272 is spaced a distance above the ground. Together, the walls 270 and the roof 272 enclose a volume that contains the components of the refuse depot 30 (e.g., the centralized storage 32, the charging stations 34, etc.), protecting the refuse depot 30 from weather and intruders. A gate 234 is selectively repositionable between the open position, shown in FIG. 10, and the closed position, shown in FIG. 11, to selectively prevent access to the enclosed volume.

As shown, the refuse actuators 232 include a first actuator, shown as lateral actuator 280, a pair of second actuators, shown as longitudinal actuators 282, and a third actuator, shown as vertical actuator 284. The lateral actuators 280 are coupled to the refuse interface 230 and move the refuse interface 230 in a first direction (e.g., laterally). The longitudinal actuators 282 are coupled to the lateral actuator 280 and the chassis 200. The longitudinal actuators 282 are coupled to the lateral actuator 280 and the chassis 200 and move the refuse interface 230 and the lateral actuator 280 in a second direction (e.g., longitudinally). In some embodiments, the first direction and the second direction are both within a common horizontal plane. Accordingly, the lateral actuator 280 and the longitudinal actuators 282 facilitate moving the refuse interface 230 to a desired position (e.g., above the centralized storage 32, above a refuse collection drone 20, above the refuse vehicle 40, etc.). The vertical actuator 284 moves the refuse interface 230 vertically (i.e., raises and lowers the refuse interface 230). The refuse actuators 232 may include electric motors that drive movement of the refuse interface 230.

During operation, the controller 242 may utilize the camera 262 and the refuse actuators 232 to facilitate efficient packing of the centralized storage 32, optimizing the amount of refuse that can be contained within the fixed storage volume 210 of the centralized storage 32. The controller 242 may utilize the refuse layout data to identify (a) filled sections of the storage volume 210 containing refuse and (b) empty sections of the storage volume 210 that are empty and available to receive refuse. By way of example, the controller 242 may divide the storage volume 210 into a lateral, longitudinal, and vertical grid of sections or zones (e.g., each zone having a lateral coordinate, a longitudinal coordinate, and a vertical coordinate). The controller 242 may assign each section an identifier indicating if the section is an empty section or a filled section. The controller 242 may move the refuse actuators 232 to fill empty sections with refuse, and once filled, reassign the identifier for that section to indicate that the section is a filled section.

The controller 242 may seek to fill the sections in a particular order. By way of example, the controller 242 may fill a lateral row of empty sections, then subsequently fill the adjacent lateral row. This process may be repeated until a vertical layer is completely filled. The controller 242 may seek to completely fill each vertical layer of the storage volume 210 prior to filling subsequent (i.e., higher) layers. By filling the storage volume 210 in this way, the controller 242 may ensure that the refuse is packed as tightly as possible. If the positions of the refuse within the storage volume 210 shifts during operation (e.g., due to settling of refuse due to gravity, due to compaction by the packing actuator 214, etc.), the change may be identified using the camera 262, and the controller 242 may adjust the packing strategy accordingly.

The centralized storage 32 may include a pair of interfaces, shown as fork passages 290. The fork passages 290 are each configured to receive a fork to facilitate engagement of the refuse vehicle 40 with the centralized storage 32. The centralized storage 32 may be lifted by the refuse vehicle 40 using the fork passages 290 to permit emptying the centralized storage 32 (e.g., by lifting and inverting the centralized storage 32). Alternatively, refuse may be unloaded from the centralized storage 32 into the refuse vehicle 40 by the refuse interface 230 and the refuse actuators 232.

Figure 12:
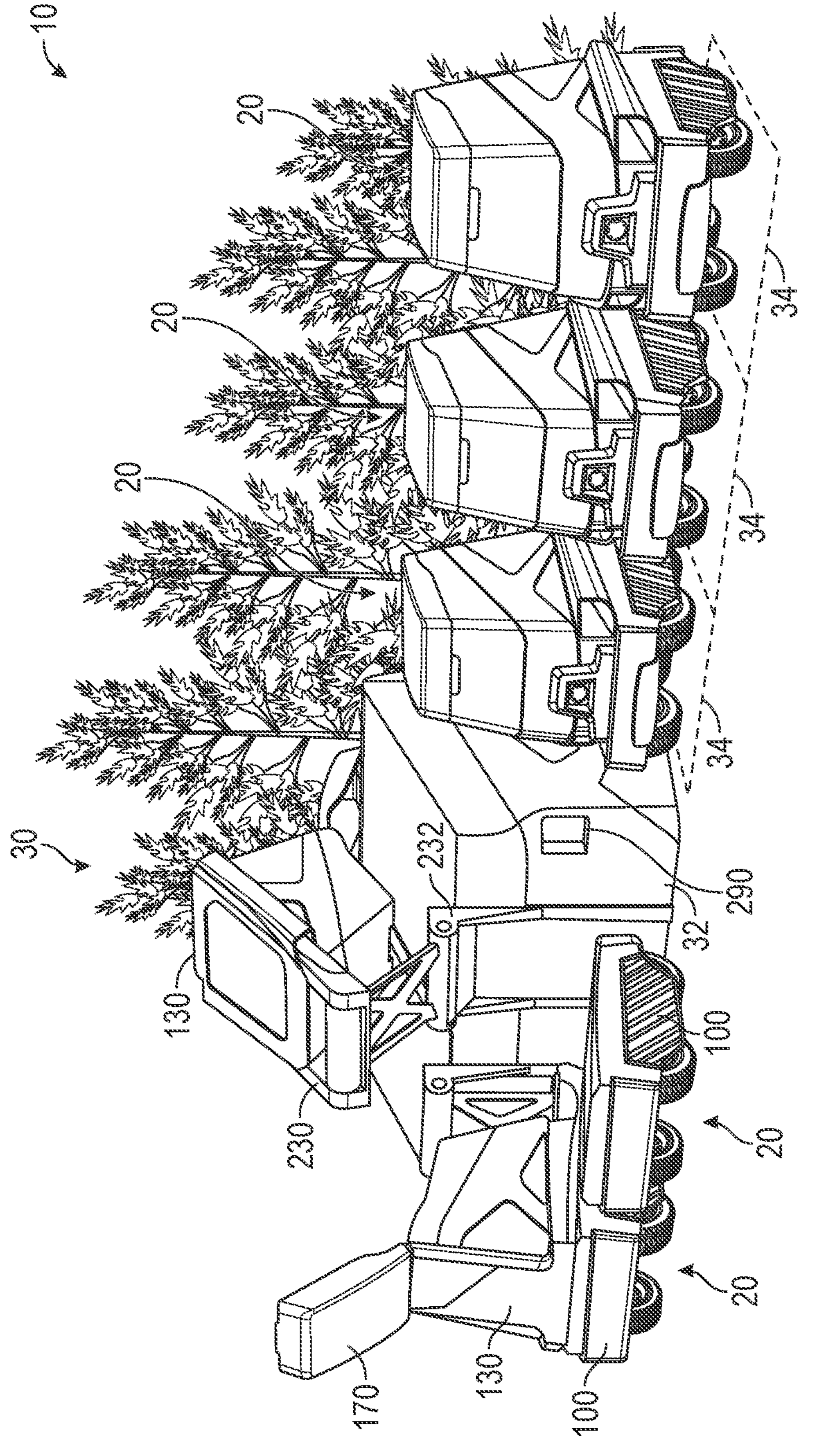
FIG. 12 is a perspective view of the refuse depot of FIG. 8, according to an alternative embodiment.

Referring to FIG. 12, the refuse depot 30 is illustrated according to an alternative embodiment. In the refuse depot 30 of FIG. 12, a refuse actuator 232 are coupled to the centralized storage 32. The refuse interface 230 is a grabber including a pair of forks that are configured to be received within the fork passages 182 of the bins 130 to couple the refuse interface 230 to the bins 130. The refuse actuator 232 is configured to rotate about a first horizontal axis relative to the centralized storage 32 and configured to rotate about a second horizontal axis relative to the refuse interface 230. This rotation raises and inverts the bin 130 to empty the refuse into the centralized storage 32.

Refuse Vehicle

Figure 13A:
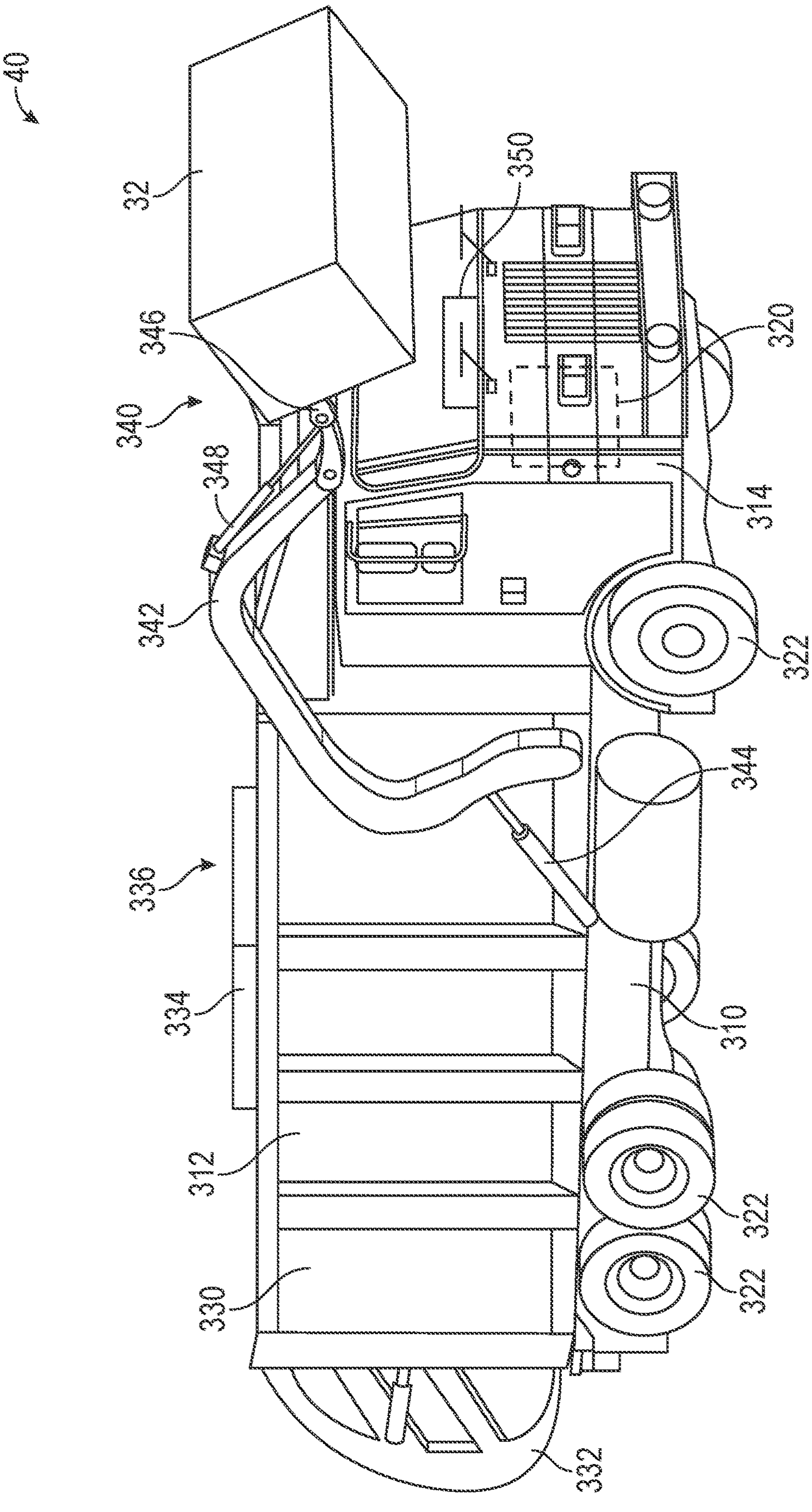
FIG. 13A is a perspective view of a refuse vehicle of the refuse collection system of FIG. 1, according to an exemplary embodiment.

Referring to FIG. 13A, a vehicle, shown as refuse vehicle 40 (e.g., a garbage truck, a waste collection truck, a sanitation truck, etc.), is configured as a front-loading refuse vehicle. In other embodiments, the refuse vehicle 40 is configured as a side-loading refuse vehicle, a zero radius side-loading refuse vehicle, or a rear-loading refuse vehicle. In still other embodiments, the vehicle is another type of vehicle (e.g., a skid-loader, a telehandler, a plow truck, a boom lift, etc.). As shown in FIG. 13A, the refuse vehicle 40 includes a chassis, shown as frame 310; a body assembly, shown as body 312, coupled to the frame 310 (e.g., at a rear end thereof, etc.); and a cab, shown as cab 314, coupled to the frame 310 (e.g., at a front end thereof, etc.). The cab 316 may include various components to facilitate operation of the refuse vehicle 40 by an operator (e.g., a seat, a steering wheel, hydraulic controls, a user interface, an acceleration pedal, a brake pedal, a clutch pedal, a gear selector, switches, buttons, dials, etc.). In other embodiments, the refuse vehicle 40 is operated autonomously.

As shown in FIG. 13A, the refuse vehicle 40 includes a prime mover, shown as engine 320, coupled to the frame 310 at a position beneath the cab 314. The engine 320 is configured to provide power to tractive elements, shown as wheels 322, and/or to other systems of the refuse vehicle 40 (e.g., a pneumatic system, a hydraulic system, etc.). The engine 320 may be configured to utilize one or more of a variety of fuels (e.g., gasoline, diesel, bio-diesel, ethanol, natural gas, etc.), according to various exemplary embodiments. According to an alternative embodiment, the engine 320 additionally or alternatively includes one or more electric motors coupled to the frame 310 (e.g., a hybrid refuse vehicle, an electric refuse vehicle, etc.). The electric motors may consume electrical power from an on-board storage device (e.g., batteries, ultra-capacitors, etc.), from an on-board generator (e.g., an internal combustion engine, etc.), and/or from an external power source (e.g., overhead power lines, etc.) and provide power to the systems of the refuse vehicle 40.

According to an exemplary embodiment, the refuse vehicle 40 is configured to transport refuse from the refuse depot 30 to a disposal facility (e.g., a landfill, an incineration facility, a recycling facility, etc.). As shown in FIG. 13A, the body 312 includes a plurality of panels, shown as panels 330, a tailgate 332, and a cover 334. The panels 330, the tailgate 332, and the cover 334 define a collection chamber (e.g., hopper, etc.), shown as refuse compartment 336. Loose refuse may be placed into the refuse compartment 336 where it may thereafter be compacted. The refuse compartment 336 may provide temporary storage for refuse during transport to a disposal facility. In some embodiments, at least a portion of the body 312 and the refuse compartment 336 extend in front of the cab 16. According to the embodiment shown in FIG. 13A, the body 312 and the refuse compartment 336 are positioned behind the cab 314. In some embodiments, the refuse compartment 336 includes a hopper volume and a storage volume. Refuse may be initially loaded into the hopper volume and thereafter compacted into the storage volume. According to an exemplary embodiment, the hopper volume is positioned between the storage volume and the cab 314 (e.g., refuse is loaded into a position of the refuse compartment 336 behind the cab 314 and stored in a position further toward the rear of the refuse compartment 336). In other embodiments, the storage volume is positioned between the hopper volume and the cab 314 (e.g., a rear-loading refuse vehicle, etc.).

As shown in FIG. 13A, the refuse vehicle 40 includes a first lift mechanism/system (e.g., a front-loading lift assembly, etc.), shown as lift assembly 340. The lift assembly 340 includes a pair of arms, shown as lift arms 342, coupled to the frame 310 and/or the body 312 on either side of the refuse vehicle 40 such that the lift arms 342 extend forward of the cab 314 (e.g., a front-loading refuse vehicle, etc.). In other embodiments, the lift assembly 340 extends rearward of the body 312 (e.g., a rear-loading refuse vehicle, etc.). In still other embodiments, the lift assembly 340 extends from a side of the body 312 (e.g., a side-loading refuse vehicle, etc.). The lift arms 342 may be rotatably coupled to the frame 310 with a pivot (e.g., a lug, a shaft, etc.). As shown in FIG. 13A, the lift assembly 340 includes first actuators, shown as lift arm actuators 344 (e.g., hydraulic cylinders, etc.), coupled to the frame 310 and the lift arms 342. The lift arm actuators 344 are positioned such that extension and retraction thereof rotates the lift arms 342 about an axis extending through the pivot, according to an exemplary embodiment. The lift arms 342 may be removably coupled to the centralized storage 32. The lift assembly 340 further includes a pair of lift forks 346 that selectively engage the fork passages 290 of the centralized storage 32 to selectively couple the centralized storage 32 to the lift assembly 340. The lift assembly 340 includes a pair of second actuators, shown as fork actuators 348, that cause rotation of the lift forks 346 relative to the lift arms 342. Through actuation of the lift arm actuators 344 and the fork actuators 348, the lift assembly 340 may raise and invert the centralized storage 32 to empty the refuse from the centralized storage 32 into the refuse compartment 336. Alternatively, the centralized storage 32 may be a roll-off dumpster that is sized to be supported by the frame 310 of the refuse vehicle 40 for transport. In such embodiments, the lift assembly 340 may be used to raise, lower, and secure the dumpster onto the frame 310.

In some embodiments, the refuse vehicle 40 includes an operator interface, shown as vehicle interface 350. The vehicle interface 350 may include a controller including a processor and a memory, a communication interface that facilitates communication with the other devices of the system 10, and a user interface (e.g., a display). The vehicle interface 350 may relay commands to an operator of the refuse vehicle 40. By way of example, the service manager 60 may provide a request for pickup to the vehicle interface 350. The request may include instructions for an operator to empty a centralized storage 32 of a particular refuse depot 30 and/or instructions for navigating to the refuse depot 30 (e.g., turn-by-turn instructions). Alternatively, the refuse vehicle 40 may be an autonomous vehicle, and the vehicle interface 350 may control operation (e.g., steering, propulsion, braking, movement of the lift assembly 340) autonomously according to instructions from the service manager 60.

Figure 13B:
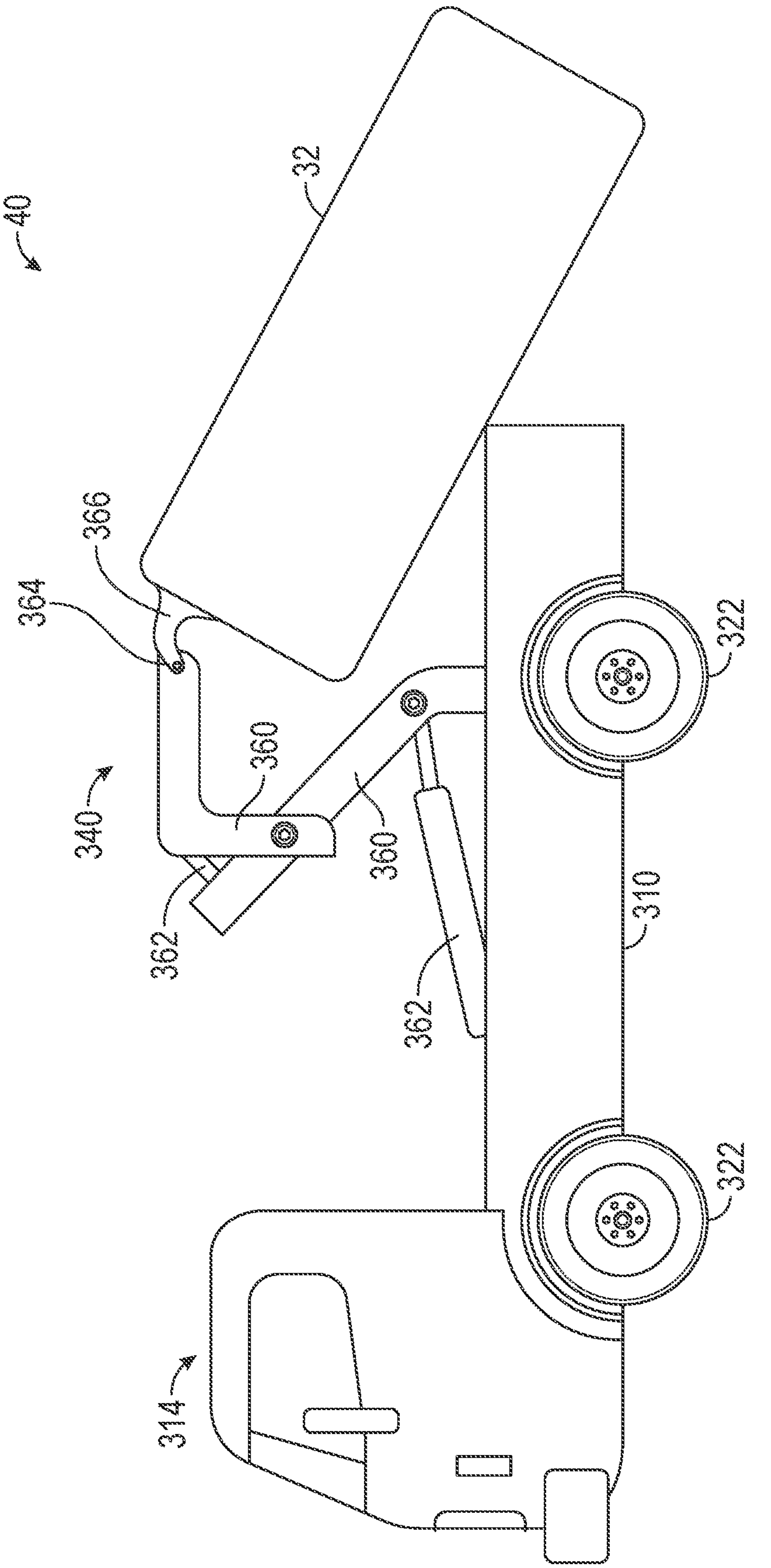
FIG. 13B is a side view of a refuse vehicle of the refuse collection system of FIG. 1, according to another exemplary embodiment.

Referring to FIG. 13B, the refuse vehicle 40 is shown according to an alternative embodiment. The refuse vehicle 40 of FIG. 13B may be substantially similar to the refuse vehicle 40 of FIG. 13A, except as otherwise specified herein. The refuse vehicle 40 of FIG. 13B is configured as a roll off dumpster truck that supports the centralized storage 32 on the frame 310. The lift assembly 340 of FIG. 13B includes a pair of structural segments, shown as arms 360. One arm 360 is pivotally coupled to the frame 310, and a second arm 360 is pivotally coupled to a distal end portion of the first arm 360. A pair of actuators (e.g., hydraulic cylinders), shown as lift actuators 362, control movement of the arms 360. A distal end of the second arm 360 includes an interface, shown as hook 364, that selectively engages an interface 366 of the centralized storage 32 to selectively couple the centralized storage 32 to the lift assembly 340.

In operation, the refuse vehicle 40 approaches the centralized storage 32, and the lift actuators 362 are operated to move the hook 364 into engagement with the interface 366. The lift actuators 362 then retract to raise the centralized storage onto the frame 310, such that the centralized storage 32 moves with the refuse vehicle 40. When interacting with the refuse depot 30, the refuse vehicle 40 may drop off an empty centralized storage 32 and pick up a centralized storage 32 that is filled with refuse. The refuse vehicle 40 may transport the filled centralized storage 32 to a refuse processing facility. In other embodiments, the refuse vehicle 40 otherwise engages and transports the centralized storage 32. By way of example, the centralized storage 32 may be mounted on a trailer, and the refuse vehicle 40 may engage the trailer such that the centralized storage 32 is trailed behind the frame 310.

User Device

Figure 14:
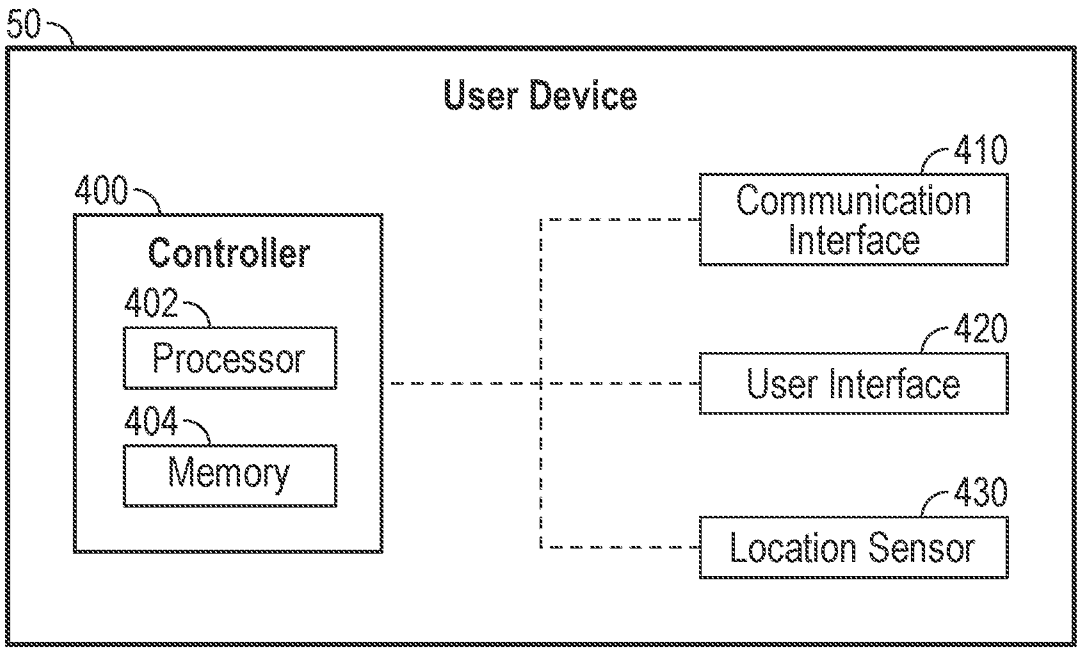
FIG. 14 is a block diagram of a user device of the refuse collection system of FIG. 1, according to an exemplary embodiment.

Referring to FIG. 14, the user device 50 is shown according to an exemplary embodiment. The user device 50 includes a controller 400 that controls operation of the user device 50. The controller 400 includes a processing circuit, shown as processor 402, and a memory device, shown as memory 404. The memory 404 may contain one or more instructions that, when executed by the processor 402, cause the controller 400 to perform the processes described herein. While some processes may be described as being performed by the controller 400, it should be understood that those processes may be performed by any other controller of the system 10 or distributed across multiple controllers of the system 10.

The user device 50 further includes a network interface, shown as communication interface 410, operatively coupled to the controller 400. The communication interface 410 is configured to transfer data between the user device 50 and other components of the system 10 (e.g., the refuse collection drones 20, the refuse depot 30, the refuse vehicle 40, other user devices 50, the service manager 60, the network 70, etc.). The communication interface 410 may facilitate wired and/or wireless communication.

The user device 50 further includes an input/output device, shown as user interface 420, operatively coupled to the controller 400. The user interface 420 facilitates communication between a user (e.g., a customer) and the user device 50. The user interface 420 may include one or more input devices (e.g., touchscreens, buttons, switches, microphones, keyboards, mice, etc.) that facilitate the user providing inputs (e.g., commands) to the user device 50. The user interface 420 may include one or more output devices (e.g., displays, speakers, haptic feedback devices, etc.) that facilitate providing information to the user. In some embodiments, the user interface 420 provides integration with a voice-based assistant. By way of example, the user interface 420 may permit a user to request a refuse collection or a status update regarding an in-progress refuse collection through a voice command. The user may initiate a request for refuse collection through the user interface 420. The user interface may provide information to a user such as a current location of a refuse collection drone 20, or billing information.

The user device 50 further includes one or more position, velocity, and/or acceleration sensors, shown as location sensor 430, operatively coupled to the controller 400. The location sensor 430 is configured to provide location data relating to the current location of the user device 50. By way of example, the location sensor 430 may include a global positioning system (GPS) that provides the current location of the user device 50 relative to the Earth. The location data may be used to determine a pickup location for the refuse collection drones 20. By way of example, a user may interact with the user interface 420 to request refuse collection at their current location. The user device 50 may use the location sensor 430 to determine the current location of the user device 50 and instruct a refuse collection drone 20 to travel to the current location.

Service Manager

Figure 15:
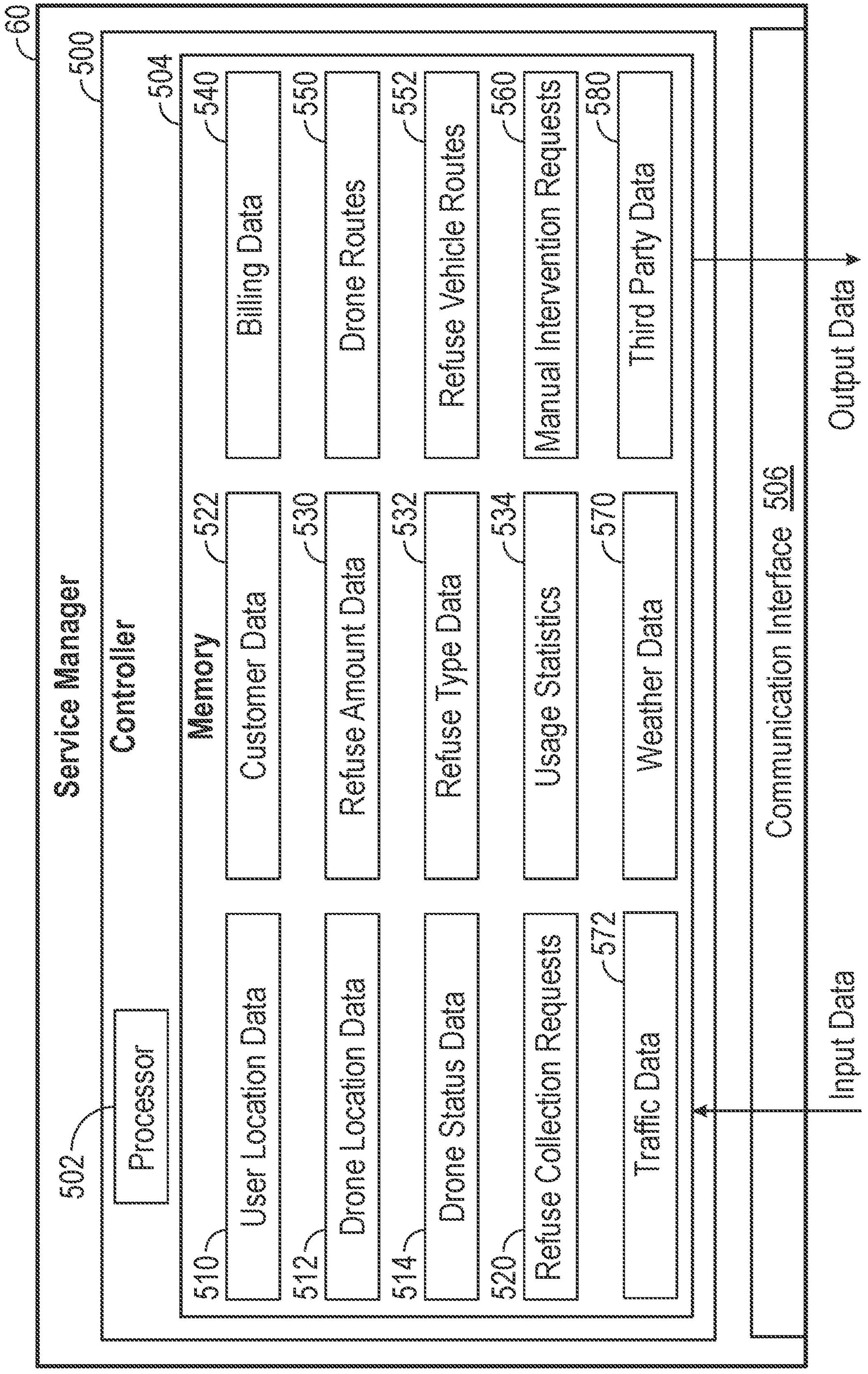
FIG. 15 is a block diagram of a service manager of the refuse collection system of FIG. 1, according to an exemplary embodiment.

Referring to FIG. 15, the service manager 60 is shown according to an exemplary embodiment. The service manager 60 includes a controller 500 that controls operation of the service manager 60. The controller 500 includes a processing circuit, shown as processor 502, and a memory device, shown as memory 504. The memory 504 may contain one or more instructions that, when executed by the processor 502, cause the controller 500 to perform the processes described herein. While some processes may be described as being performed by the controller 500, it should be understood that those processes may be performed by any other controller of the system 10 or distributed across multiple controllers of the system 10.

The service manager 60 further includes a network interface, shown as communication interface 506, operatively coupled to the controller 500. The communication interface 506 is configured to transfer data between the service manager 60 and other components of the system (e.g., the refuse collection drones 20, the refuse depot 30, the refuse vehicle 40, the user devices 50, the network 70, etc.). The communication interface 506 may facilitate wired and/or wireless communication.

The service manager 60 may receive various inputs (e.g., input data) and provide various outputs (e.g., output data) throughout operation. Specifically, the data is transferred between the service manager 60 and the other components of the system 10 through the communication interface 506. The data may be stored (e.g., temporarily or permanently) in the memory 504. The data may be transferred to other components of the system 10 or analyzed by the controller 500. By way of example, the service manager 60 may utilize multiple sources of data to generate new data that is utilized by the system 10. In some embodiments, the service manager 60 has greater processing capabilities than the other controllers of the system 10. Accordingly, it may be advantageous for certain complex calculations to be performed by the service manager 60. In some embodiments, the service manager 60 utilizes advanced calculation techniques, such as artificial intelligence, machine learning, neural networks, etc. The service manager 60 may utilize this enhanced processing ability along with all of the data available within the system 10 (e.g., the usage statistics 534) to continuously optimize operation of the system (e.g., minimizing customer wait times and energy usage, etc.).

Drone and User Location

The memory 504 stores user location data 510 that indicates a location of one or more users (e.g., customers) or the location of one or more user devices 50. The user location data 510 may be generated by the location sensor 430 of a user device 50. By way of example, when initiating a request for refuse collection, the user device 50 may determine the current location of the user associated with the user device 50 (e.g., using the location sensor 430) and transfer the user location data 510 to the service manager 60. The user location data 510 may be updated periodically throughout the refuse collection process to ensure accuracy in the event that the user changes locations.

The memory 504 stores drone location data 512 that indicates the location of one or more refuse collection drones 20. The drone location data 512 may be generated by the location sensor 160 of a refuse collection drone 20 and periodically transferred to the service manager 60. The drone location data 512 may provide a real-time or periodic view into the current locations of the refuse collection drones 20. The drone location data 512 may facilitate navigation of the refuse collection drones 20 and determining which of the refuse collection drones 20 to assign to a particular route.

Drone Status

The memory 504 stores drone status data 514 that indicates a current status of one or more refuse collection drones 20. The drone status data 514 may be generated by the controller 142 of a refuse collection drone 20, by the refuse depot 30, and/or by the service manager 60. In some embodiments, the drone status data 514 indicates a current assignment or task associated with a refuse collection drone 20. By way of example, the drone status data 514 may indicate if the refuse collection drone 20 is (a) on the way to a pickup zone to perform a refuse collection event, (b) being loaded with refuse by a customer, (c) returning from a pickup zone to the refuse depot 30, (d) being unloaded at the refuse depot 30, (e) idle at the refuse depot 30 and charging, or (f) idle at the refuse depot 30 and not charging. In some embodiments, the drone status data 514 indicates data measured by one or more sensors onboard the refuse collection drone 20, such as a current charge level of the batteries 120, an amount of refuse currently being carried by a refuse collection drone 20 (e.g., indicative of an available capacity of the refuse collection drone 20), a number of hours that the refuse collection drone 20 has operated (e.g., since the last time the refuse collection drone 20 was maintained, etc.), or other conditions.

In some embodiments, the drone status data 514 indicates if a refuse collection drone 20 has experienced an error or is likely to experience an error. Such an error may indicate that the refuse collection drone 20 is incapable of completing a current task without manual intervention by a user (e.g., maintenance, moving the refuse collection drone 20, removing an obstacle, etc.). The controller 142 may analyze data from the location sensor 160, the environment sensors 162, and/or the camera 166 to determine if an error has occurred or is likely to occur. By way of example, the controller 142 may determine that refuse collection drone 20 is currently immobilized (e.g., due to a loss of traction, a failure of a component, a lack of charge in the batteries 120, etc.). By way of another example, the controller 142 may determine a current path of the refuse collection drone 20 is obstructed by an obstacle.

Collection Requests

The memory 504 may store refuse collection requests 520 from customers. The refuse collection requests 520 may originate in the user devices 50 and/or the connected devices 52. The refuse collection requests 520 may indicate an identity of the customer requesting the refuse collection, a desired location for the refuse collection (e.g., a location of the pickup zone), a desired timing of the refuse collection, a desired type or amount of refuse to be collected, or other information regarding the refuse collection. By way of example, the user device 50 may monitor the location of the customer through the location sensor 430, and set the current location of the customer as the pickup zone.

In some embodiments, user device 50 runs an application (e.g., a refuse collection hailing application) that facilitates generation of the refuse collection requests 520 by a customer. The application may be stored within the memory 404 of the user device 50. The application may control a display of the user interface 420 to provide a graphical user interface (GUI) that communicates information to the customer and/or receives commands from the customer. By way of example, the customer may interact with elements of the GUI through a touch screen of the user interface 420 to generate and/or modify the refuse collection request 520.

The customer may use the application to initiate a refuse collection request 520. The GUI may provide various options for the timing of the refuse collection (e.g., "as soon as possible," "on my collection day," "request a specific pickup time," etc.). If a user selects "as soon as possible," the service manager 60 may assign the refuse collection request 520 to the closest refuse collection drone 20 that is available. If the user selects "on my collection day" (e.g., indicating a predetermined, recurring day of the week or date) or "request a specific pickup time," the service manager 60 may schedule a refuse collection drone 20 to arrive at the specified day and/or time. The GUI may also provide various options for selecting a desired location for the refuse collection (e.g., entering an address, based on the sensed location of the user device 50, etc.), a desired type of refuse to be collected (e.g., garbage, recycling, organics, etc.), an amount of refuse to be collected (e.g., a number of bags, specifying that a large item (e.g., furniture, yard waste, etc.) will be removed, etc.), or other information regarding the refuse collection.

Additionally or alternatively, the user device 50 may permit a customer to provide a refuse collection request 520 through a voice command. By way of example, the user device 50 may utilize a voice assistant (e.g., a voice-based virtual assistant) to interpret the voice commands. As used herein, the term "voice assistant" refers to any software and/or or hardware that interprets a vocal input as a command. The customer may provide the specific details refuse collection request 520 verbally. By way of example, the customer may state "please schedule a garbage pickup for this Thursday and a recurring recycling pickup on the first of each month at my home address." The user device 50 and/or the service manager 60 may analyze this message and identify two separate refuse collection requests 520. The first request may indicate that garbage will be collected on the upcoming Thursday at a predetermined home location associated with the user. The second request may indicate that recyclables will be collected on the first day of each month from the predetermined home address.

The service manager 60 may use information from the refuse collection request 520 to determine the amount of refuse that will be collected (e.g., the refuse amount data 530) and/or the type of refuse that will be collected (e.g., the refuse type data 532). The customer may directly indicate the amount and/or type of refuse that will be collected. By way of example, the customer may indicate that they have three bags of garbage and one container (e.g., a standard-sized container) of recyclables that they would like to have collected. By way of another example, the customer may indicate that they would like to have an oversized object that they would like to have collected. Examples of potential oversized objects include furniture (e.g., couches, desks, mattresses, etc.), televisions, yard waste (e.g., tree limbs, bushes, large stones, etc.), construction waste (e.g., lumber, windows, doors, sinks, toilets, etc.), or other large objects. An oversized object may not fit within a standard size of refuse collection drone 20, and the service manager 60 may instead assign a specialized, larger refuse collection drone 20 for such a pickup. A refuse collection request 520 for an oversized item may include the dimensions of the oversized item to be collected.

Customer Information

The memory 504 may store customer data 522 regarding or more customers (e.g., customer information). The customer data 522 may facilitate identifying the customer. The customer data 522 may indicate a name, demographic data (e.g., age, gender, etc.), a location of a preferred pickup zone (e.g., a home address, one or more commercial addresses, coordinates, etc.), payment/billing information (e.g., a bank account number, debit card number, or credit card number), or other information associated with the customer. The customer may provide the customer data 522 when initially signing up for the refuse collection service and/or update the customer data 522 through a user device 50 (i.e., the customer data 522 may be predetermined, prior to deployment of any refuse collection drones 520).

The customer may choose to have a pickup zone that varies based on their current location or the location of a user device 50 or a pickup zone at a fixed location (e.g., specified in the refuse collection request 520 or the customer data 522). If the customer chooses a variable pickup location, the user location data 510 may indicate the desired location of the pickup zone. If a user chooses a fixed location for the pickup zone, the desired location may be preselected by a user. By way of example, the user may indicate the desired location using an address or a coordinate. To provide an even greater degree of specificity, the user may indicate a certain feature at the address or coordinate that defines the desired location. By way of example, the desired location may be defined at or near a specific door (e.g., a front door, back door, a garage door, etc.), an end of a driveway, an end of a sidewalk, or another feature. In some embodiments, the feature that defines the desired location is common for multiple different customers. By way of example, a home owners association may designate the locations of the pickup zones for a neighborhood or building complex.

Refuse Type and Amount Data

The memory 504 may store refuse amount data 530 indicating the amount (e.g., weight, volume, etc.) of refuse collected by the system 10. The refuse amount data 530 may be provided by the refuse collection drones 20 (e.g., as determined using the weight sensors 164), by the refuse depots 30 (e.g., as determined using the weight sensors 260), or by the refuse collection requests 520 (e.g., directly or determined based information contained within the refuse collection requests 520). The refuse amount data 530 may be associated with a particular refuse collection event and/or with a particular customer. By way of example, the refuse amount data 530 may indicate that 50 lbs of refuse was collected from Customer A at date/time B from a pickup zone at location C.

The memory 504 may store refuse type data 532 indicating the type (e.g., garbage, recyclables, organics, compostables, etc.) of refuse collected by the system 10. The refuse type data 532 may be provided by the refuse collection drones 20 (e.g., as determined using the cameras 166), and/or by the refuse depots 30 (e.g., as determined using the cameras 262), and/or by the refuse collection requests 520 (e.g., directly or determined based information contained within the refuse collection requests 520). The refuse type data 532 may be associated with a particular refuse collection event and/or with a particular customer. By way of example, the refuse amount data 530 may indicate that recyclable refuse was collected from Customer A at date/time B from a pickup zone at location C. The refuse amount data 530 and the refuse type data 532 may be used together to fully describe a particular refuse collection event.

System Usage

Utilizing the refuse collection requests 520, the refuse amount data 530, the refuse type data 532, and the customer data 522, the service manager 60 may generate and store usage statistics 534 in the memory 504. The usage statistics 534 may provide a representation of the operation of the system 10 and how the system 10 is being used. The usage statistics 534 indicate how the system 10 is being utilized by particular individuals or groups of individuals. The usage statistics 534 may indicate the amount and type of refuse being collected and how those values vary over time. The usage statistics 534 may be broken down by individual customers, neighborhoods, townships, cities, states, countries, or other regions.

The usage statistics 534 may provide insights to governmental entities, to the company operating the system 10, to individual customers, or to other entities. The usage statistics 534 may indicate the relative amounts of each type of refuse being collected (e.g., 20% recyclables, 80% non-recyclables, etc.). The usage statistics 534 may indicate certain individuals, groups of individuals, or regions that are producing above or below the average amount of refuse. The usage statistics 534 may indicate trends over time (e.g., cyclical or annual trends, long-term trends, etc.). By way of example, the usage statistics 534 may indicate greater amounts of refuse are collected during certain parts of the year (e.g., more refuse being collected during the holiday months, more compostable refuse being collected in the spring than during the winter, etc.). By way of example, the usage statistics 534 may indicate that certain individuals or regions are producing more or less refuse over time.

The service manager 60 may provide the usage statistics 534 for presentation to users (e.g., customers) or entities (e.g., the company operating the system 10, a governmental entity, etc.). By way of example, an entity may query the service manager 60 to provide a particular set of usage statistics 534 (e.g., usage statistics 534 associated with a particular customer or region for a particular time period). A customer or entity may act on the usage statistics 534. By way of example, a governmental entity may utilize the usage statistics 534 to further sustainability efforts. The usage statistics 534 may identify regions having undesirable refuse production habits (e.g., that are producing large amounts of refuse or that are recycling only a small portion of their produced refuse) and concentrate sustainability efforts on those regions (e.g., by concentrating funding on programs to improve the refuse production habits of those regions).

In some embodiments, the service manager 60 generates and provides instructions or recommendations based on the usage statistics 534. By way of example, the service manager 60 may provide recommendations to a customer or group of customers (e.g., customers within a particular region) that are intended to improve their refuse production habits (e.g., by produce less refuse or recycling a larger portion of their refuse). The service manager 60 may assign penalties or incentives to facilitate enforcement of those recommendations. By way of example, the service manager 60 may assign additional fees for customers with undesirable refuse habits. By way of another example, the service manager 60 may assign billing credits (i.e., a reduction in billed fees) for customers with desirable refuse habits.

Dynamic Resource Assignment

The service manager 60 may adjust the number of refuse collection drones 20, refuse depots 30, and/or refuse vehicles 40 assigned to a particular region based on usage statistics 534. In some embodiments, the refuse collection drones 20, the refuse depots 30, and/or the refuse vehicles 40 are placed in the desired region by another vehicle. Alternatively, the refuse collection drones 20 and/or the refuse vehicles 40 may move themselves to the desired region. By way of example, the service manager 60 may command the refuse collection drones 20 to move from a first area that is predicted to have a reduced refuse production to a second area that is predicted to have an increased refuse production. By way of another example, if the usage statistics 534 indicate that a region will have an overall increase in refuse production, more refuse collection drones 20, refuse depots 30, and/or refuse vehicles 40 may be added to the system 10 within that region. By adjusting the number of refuse collection drones 20, refuse depots 30, and/or refuse vehicles 40 to suit changes in demand within a particular region (e.g., predicted by the usage statistics 534), the system 10 can ensure that an appropriate number of refuse vehicles 40 will be available to service the demand of that region.

In some embodiments, the system 10 includes multiple refuse depots 30 within range of a given refuse collection drone 20 (i.e., a refuse collection drone 20 is capable of navigating to multiple different refuse depots 30 under its own power). In some embodiments, each refuse collection drone 20 is assigned to a particular refuse depot 30, such that the refuse collection drone 20 consistently returns to a given refuse depot 30. In other embodiments, the service manager 60 may instruct a refuse collection drone 20 to begin from a first refuse depot 30 and return to a second refuse depot 30. The service manager 60 may reassign a refuse collection drone 20 to a different refuse depot 30 based on the refuse amount data 530. By way of example, the service manager 60 may reassign a refuse collection drone 20 to the second refuse depot 30 in response to an indication that the centralized storage 32 of the first refuse depot 30 has exceeded a threshold fill level. The service manager 60 may reassign a refuse collection drone 20 to a different refuse depot 30 based on the number of available charging stations 34. By way of example, the service manager 60 may reassign a refuse collection drone 20 to the second refuse depot 30 in response to a determination that none of the charging stations 34 of the first refuse depot 30 are available.

Customer Billing

Referring still to FIG. 15, the service manager 60 is configured to generate billing data 540 and store the billing data 540 in the memory 504. The billing data 540 indicates the amount owed by each customer in exchange for services provided by the system 10 or services to be provided by the system 10 in the future. The service manager 60 may utilize any of the data generated by the service manager 60 to generate the billing data 540. By dynamically adjusting pricing, the service manager 60 may be able to facilitate or discourage demand and maintain a consistent usage of the system 10. The service manager 60 may also adjust pricing to account for the usage level of each specific customer (e.g., as opposed to charging a flat rate per month regardless of usage).

The user devices 50 may inform the customer of a projected cost of a collection event in advance. By way of example, the user device 50 may display the projected cost on a user interface 420 as part of the process for requesting a refuse collection event. The user device 50 may also display any factors affecting the projected cost, such as the current demand and/or the type of refuse that is being collected. The customer may be required to accept the projected cost prior to initiating the collection event.

The billing data 540 may be generated based on the refuse collection requests 520. By way of example, the service manager 60 may charge based on the number of refuse collection events requested by the customer. The service manager 60 may charge a flat fee for each request. The service manager 60 may provide a discount for a threshold number of collection events within a given period of time (e.g., monthly, weekly, etc.).

The service manager 60 may charge based on the date and/or time of refuse collection events requested by the customer. By way of example, the service manager 60 may charge more for refuse collection events occurring during days or times of elevated demand, or the service manager 60 may offer discounts for collection events occurring during times of low demand. The periods of elevated demand or low demand may be static and predetermined. Elevated demand periods may include time periods surrounding holidays (e.g., Christmas, New Years, etc.), weekends, mornings (e.g., 7:00 AM to 10:00 AM), and evenings (e.g., 5:00 PM to 10:00 PM). Low demand periods may include weekdays, midday (e.g., 10:00 AM to 5:00 PM), or nights (e.g., 10:00 PM to 7:00 AM). In some embodiments, the elevated demand periods and low demand periods may be determined based on the usage statistics 514. For example, the service manager 60 may monitor the demand for a test period (e.g., a month, a year, etc.) and set the elevated demands periods and/or low demand periods based on the demand throughout of the test period.

The billing data 540 may be generated based on the drone status data 514. By way of example, the service manager 60 may utilize the drone status data 514 to provide dynamic pricing based on the current demand of the system 10. The service manager 60 may determine how many of the refuse collection drones 20 are currently in use or otherwise unavailable to respond to customer requests (e.g., traveling to a customer, filled with refuse, containing a package, etc.). As the number of unavailable refuse collection drones 20 increases (i.e., as the number of available refuse collection drones 20 decreases), the service manager 60 may increase the projected cost of the refuse collection event.

The billing data 540 may be generated based on the refuse amount data 530 and/or the refuse type data 532. The service manager 60 may charge more for collecting greater amounts of refuse. By way of example, the service manager 60 may charge per unit weight of refuse collected (e.g., based on the weight sensed by the weight sensor 164). By way of another example, the service manager 60 may utilize the refuse collection request 520 to determine a size of refuse collection drone 20 that is required to fulfil the refuse collection request. The system may implement a surcharge (i.e., increase pricing) for larger refuse collection drones 20. The service manager 60 may adjust pricing based on the type of refuse being collected. The serve manager 60 may charge a predetermined rate (e.g., $20 per collection, $0.50 per pound, etc.) for each type of refuse (e.g., non-recyclables, compostables, recyclables, etc.). The service manager 60 may charge an additional fee for collecting oversized items (e.g., as indicated by the customer or by an inability to close the cover 170). The service manager 60 may provide billing credits for certain types of refuse (e.g., materials having a scrap value).

The service manager 60 may communicate the billing data 540 to the associated customer through the user device 50. By way of example, the service manager 60 may communicate the billing data 540 as an email, a notification on an application, a text message, or another type of communication. Alternatively, the service manager 60 may communicate the billing data 540 to the associated customer through a paper bill.

Drone Selection and Path Generation

The service manager 60 may generate path data or navigation instructions, shown as drone routes 550, for the refuse collection drones 20 to use to navigate between the refuse depots and the pickup zones of the customers. By way of example, in response to receiving a refuse collection request 520, the service manager 60 may begin generating a drone route 550. The service manager 60 may review the drone status data 514 to identify refuse collection drones 20 that are eligible to complete the refuse collection event. Refuse collection drones 20 may be considered ineligible if the refuse collection drone 20 is currently experiencing an error. In some embodiments, a refuse collection drone 20 is considered to be ineligible if the refuse collection drone 20 is in the process of navigating back to the refuse depot 30 after executing another refuse collection event or being emptied by the refuse depot 30.

The service manager 60 may utilize the user location data 510, the refuse collection request 520, and the drone location data 512 to select an eligible refuse collection drone 20 for completing the refuse collection event. The service manager 60 may attempt to select the refuse collection drone 20 that is capable of arriving at the pickup zone most quickly. By way of example, the service manager 60 may estimate an amount of time that will be required for each refuse collection drone 20 based on a distance between the refuse collection drone 20 and the pickup zone indicated by the user location data 510 and/or the refuse collection request 520. If the refuse collection drone 20 is currently in the process of returning refuse to the refuse depot 30, the service manager 60 may adjust the estimated arrival time of the refuse collection drone accordingly.

Additionally or alternatively, the service manager 60 may use the refuse amount data 530, the refuse type data 532, and/or the usage statistics 534 to select an eligible refuse collection drone 20 for completing the refuse collection event. By way of example, using refuse amount data 530 provided by the customer in advance of the refuse collection event and/or historical usage statistics 534, the service manager 60 may predict the amount of refuse that will need to be collected during a refuse collection event. Using the drone status data 514, the service manager 60 may determine which refuse collection drones 20 have sufficient available capacity to retrieve the predicted amount of refuse, and thus are eligible for completing the refuse collection event. By way of example, certain refuse collection drones 20 may be designated for collecting only certain types of refuse (e.g., non-recyclables, recyclables, organics, oversized items, etc.). Using the refuse type data 532, the service manager 60 may determine which refuse collection drones are eligible for collecting the type of refuse associated with a given refuse collection event.

Certain users may wish to dispose of items securely, such that their refuse is not accessible to other users. By way of example, a first customer may wish to avoid a situation in which they deposit their refuse in the storage volume 132, and a second customer subsequently accesses the storage volume 132 to deposit additional refuse while the first customer's refuse remains in the storage volume 132. To accommodate such users, the system 10 may permit a user to submit a privacy request (e.g., as part of the initial refuse collection request 520) indicating that their refuse should not be accessible to other customers. In response to a privacy request, the service manager 60 may determine that the corresponding refuse collection drone 20 is ineligible for future refuse collection events until the storage volume 132 has been emptied. The billing data 540 may include a surcharge in response to a privacy request.

Additionally or alternatively, the service manager 60 may use the drone status data 514 to optimize charge levels of the refuse collection drones 20 when selecting an eligible refuse collection drone 20. Each of the refuse collection drones 20 may have an associated charge level indicating a state of charge of the corresponding batteries 120. It may be desirable to utilize the refuse collection drones 20 in such a way as to ensure that the charge levels of the refuse collection drones 20 are sufficient to complete the planned routes. By way of example, the service manager 60 may estimate a distance that each refuse collection drone 20 is able to travel based on the current charge level. The service manager 60 may avoid selecting a refuse collection drone 20 whose charge level is insufficient to complete the planned route. By way of another example, the service manager 60 may weight the selection to prefer using refuse collection drones 20 having higher charge levels. This may avoid a situation where refuse collection drones 20 having higher charge levels sit idly on the charging stations 34 while refuse collection drones 20 having lower charge levels are further depleted. When selecting a refuse collection drone 20 for a particular refuse collection event, the service manager 60 may balance the desire to have the refuse collection drone 20 arrive at the pickup zone quickly with the desire to balance the charge levels of the refuse collection drones 20 (i.e., the refuse collection drone 20 may be selected based on a charge level of the batteries 120 and a current location of the refuse collection drone 20).

Once the service manager 60 has selected a refuse collection drone 20, the service manager 60 may generate a drone route 550. Specifically, the service manager 60 may utilize map data to determine the fastest route between the current location of the refuse collection drone 20 (e.g., as indicated by the drone location data 512) and the pickup zone (e.g., as indicated by the user location data 510 and/or the refuse collection request 520). The map data may be predetermined and stored in the memory 504. Once the drone route 550 is determined, the service manager 60 may communicate the drone route 550 to the selected refuse collection drone 20.

The service manager 60 may adjust the drone route 550 to avoid known obstructions (e.g., as determined using the environment data of the refuse collection drones 20). The service manager 60 may adjust the drone route 550 based on changes in the location of the pickup zone. By way of example, the service manager 60 adjust the drone route 550 based on a user request through the user device 50, or based a change in the user location data 510. The service manager 60 may communicate any updates in the drone route 550 to the selected refuse collection drone 20.

While a refuse collection drone 20 navigates a drone route 550, the service manager 60 may command a user device 50 to provide status updates to the customer. Such status updates may include a current location of the collection drone 20 and an estimated time of arrival at the pickup zone. This information may be displayed on a screen of the user device 50 as a map.

The service manager 60 may generate path data or navigation instructions, shown as refuse vehicle routes 552, for the refuse vehicles 40 to use to navigate between the refuse depots 30. A refuse vehicle route 552 may include a fully formed path (e.g., turn-by-turn directions) for the refuse vehicle 40 to follow. Alternatively, a refuse vehicle route 552 may include a request for a refuse vehicle 40 to arrive at a particular refuse depot 30. The refuse vehicle routes 552 may include instructions that are followed by an operator of the refuse vehicle 40. Alternatively, the refuse vehicle routes 552 may include instructions that are followed by an autonomous control system of the refuse vehicle 40.

The service manager 60 may generate the refuse vehicle routes 552 based on the demands of the refuse depots 30 (e.g., the fill levels of the centralized storages 32). By way of example, the service manager 60 may utilize the refuse amount data 530 to determine the fill level of each centralized storage 32 of each refuse depot 30. The service manager 60 may determine that a refuse vehicle 40 should travel to and empty a particular refuse depot 30 when the fill level of a centralized storage 32 at the refuse depot 30 exceeds a threshold fill level. Alternatively, the service manager 60 may predict when a refuse depot 30 should be emptied by a refuse vehicle 40 based on the usage statistics 534. The usage statistics 534 may indicate how much refuse that a refuse depot 30 is predicted to receive (e.g., based on historical trends within a particular region).

Manual Intervention Requests

Referring to FIG. 15, the service manager 60 generates manual intervention requests 560 requesting for a user to perform a manual intervention. The manual intervention request 560 may cause the system 10 to provide instructions for one or more users to complete the manual intervention. The instructions may be provided by the customer display 168 of a refuse collection drone 20, a vehicle interface 350 of a refuse vehicle 40, a user interface 420 of a user device 50, and/or another user interface.

The service manager 60 may generate the manual intervention requests 560 based on the drone status data 514. Specifically, the service manager 60 may generate the manual intervention requests 560 in response to the drone status data 514 indicating that a refuse collection drone 20 has experienced an error or is likely to experience an error requiring manual intervention. Such errors may immobilize the refuse collection drone 20 or otherwise prevent the refuse collection drone 20 from completing an assigned task.

The manual intervention requests 560 may include instructions for one or more users that are intended to address the error. By way of example, the instructions may instruct the user to perform maintenance on the refuse collection drone 20 (e.g., replacing a component, lubricating a component, etc.). By way of another example, the instructions may instruct the user to charge the batteries 120 of the refuse collection drone 20. By way of another example, the instructions may instruct the user to reposition the refuse collection drone 20 back onto a path, such that the refuse collection drone 20 regains sufficient traction to travel. By way of another example, the instructions may instruct the user to remove an obstacle. In response to receiving the manual intervention request 560, the user may comply with the request (e.g., by performing maintenance, by removing an obstacle, etc.) or by adjusting the operating instructions of the refuse collection drone 20 (e.g., by designating a new drone route, by designating a new pickup zone, by canceling the request for refuse collection, etc.).

The manual intervention requests 560 may be transmitted to a customer (e.g., through a user device 50). By way of example, a manual intervention request 560 may provide instructions to a customer instructing the customer to clear an obstacle preventing the refuse collection drone from reaching the pickup zone of the customer. In one such example, the manual intervention request 560 includes a text-based instruction stating "a vehicle is preventing us from accessing your designated pickup zone. Please move the vehicle or designate a new pickup zone." The manual intervention request 560 may also include an image of the obstacle obstructing the path of the refuse collection drone 20 (e.g., captured by the environment sensors 162).

The manual intervention requests 560 may be transmitted to personnel (e.g., operators, maintenance technicians, etc.) associated with the system 10. By way of example, the service manager 60 may provide a maintenance request to a technician outlining an identifier (e.g., a serial number) identifying the refuse collection drone 20, the current location of the refuse collection drone 20, the maintenance to be performed, and the components required to perform the maintenance. By way of another example, the service manager 60 may provide a request to an operator to move the refuse collection drone 20 back to a path. The request may include an identifier identifying the refuse collection drone 20, the current location of the refuse collection drone 20, and a location of the closest portion of the drone path where the refuse collection drone should be returned.

Additionally or alternatively, the manual intervention request 560 may provide instructions for a customer to complete a refuse collection event. The instructions may be presented by a user device 50 associated with the customer and/or by a customer display 168 on the refuse collection drone 20. By way of example, the instructions may request for the customer to place refuse within the storage volume 132. The instructions may instruct the customer of what type of refuse is to be collected (e.g., the customer display 168 may indicate "non-recyclable trash only" or "recyclables only" or "compostables only," etc.). The instructions may request for the customer to close the cover 170.

If the customer does not comply with the instructions of the manual intervention request 560 in a predetermined timeframe, the system 10 may take various remedial actions. By way of example, the timeframe may be based on the time elapsed from sending the original instructions, based on the time elapsed from when the refuse collection drone 20 arrived at the pickup zone PZ, etc. The remedial actions may include a notification (e.g., visual, audible, haptic, etc.). The remedial actions may include control of the refuse collection drone 20 (e.g., movement of the refuse collection drone 20). The remedial actions may include changes to the billing data 540 (e.g., charging the customer a fine, removing the charge for refuse collection, etc.). In one non-limiting example, the service manager 60 begins a timer when a refuse collection drone 20 arrives in a PZ associated with a customer and instructs the customer to load refuse into the storage volume 132. After the timer reaches a first threshold without a manual intervention, the user device 50 provides a first notification to the customer (e.g., a push notification reminder). After the timer reaches a second threshold without a manual intervention, the refuse collection drone 20 provides a second notification to the customer (e.g., an audible alarm, such as a voice command indicating "you have 5 minutes left to deposit your trash"). After the timer reaches a third threshold without a manual intervention, the refuse collection drone 20 may return to the refuse depot 30, and the service manger 60 may charge the customer a fine or penalty for missing the scheduled collection in the billing data 540.

System Response to Weather and Traffic

Referring to FIG. 15, the service manager 60 manages operation of the system 10 based on weather data 570. The weather data 570 may include information regarding past, present, or predicted weather conditions or other environmental conditions in an area associated with the system 10. By way of example, the weather data 570 may include winds, rainfall, snowfall, lightning, natural disasters or other emergencies (e.g., fires, tornadoes, etc.). The system 10 may generate the weather data 570. By way of example, the refuse collection drones 20, the refuse depots 30, the refuse vehicles 40, and/or the user devices 50 may include sensors (e.g., temperature sensors, pressure sensors, humidity sensors, wind sensors, etc.) that provide the weather data. By way of another example, the service manager 60 may retrieve the weather data 570 from an external sources (e.g., a third party weather forecast provider) through the network 70.

Using the weather data 570, the service manager 60 may identify an obstructive event (e.g., a weather event, a natural disaster, etc.) that would hinder movement of the refuse collection drones 20 and/or potentially cause damage to the refuse collection drones 20. The service manager 60 may identify an obstructive event in progress or predict a future obstructive event. By way of example, the obstructive event may be a large snowfall that would hinder movement of the refuse collection drones 20 along a road or path. By way of another example, the obstructive event may be a wildfire, tornado, hurricane, or other natural disaster that could potentially cause damage to the refuse collection drones 20. The service manager 60 may associate the obstructive event with a location or area.

Similarly, the service manager 60 may manage operation of the system 10 based on traffic data 572. The traffic data 572 may include information regarding past, present, or predicted traffic conditions in an area associated with the system 10. By way of example, the traffic data 572 may include traffic flow, road closures, traffic accidents, etc. The system 10 may generate the traffic data 572. By way of example, the refuse collection drones 20, the refuse vehicles 40, and/or the user devices 50 may include sensors (e.g., cameras, vehicle speed sensors, accelerometers, etc.) that provide data indicating the current travel speeds of vehicles in certain locations. By way of another example, the service manager 60 may retrieve the traffic data 572 (e.g., as third party data 580) from an external sources (e.g., a third party traffic data providers) through the network 70.

Using the traffic data 572, the service manager 60 may identify an obstructive event (e.g., an accident, a road closure, a slowdown, etc.) that would hinder movement of the refuse collection drones 20 and/or potentially cause damage to the refuse collection drones 20. The service manager 60 may identify an obstructive event in progress or predict a future obstructive event. The service manager 60 may associate the obstructive vent with a location or area.

Upon identifying an obstructive event in proximity to a refuse collection drone 20, the service manager 60 may seek to minimize exposure of that refuse collection drone 20 to that obstructive event. The service manager 60 may command the refuse collection drone 20 to seek an area of shelter from the obstructive event. By way of example, the refuse collection drone 20 may navigate to a refuse depot 30 and/or a charging station 34. By way of another example, the refuse collection drone 20 may navigate to a garage or an overpass. Once the refuse collection drone 20 has reached the area of shelter, the refuse collection drone 20 may remain there (e.g., in a locked-down mode or hibernation state) until the obstructive event has passed. The service manager 60 may adjust scheduling of refuse collection events to accommodate the disruption caused by the inactivity of the refuse collection drone 20. By way of another example, the service manager 60 may adjust the drone routes 550 to avoid traffic slowdowns, road closures, or accidents.

Third Party Integration

Referring to FIG. 15, the service manager 60 manages operation of the system 10 based on third party data 580. The service manager 60 may communicate with one or more third party service providers to receive the third party data 580 and/or provide data to the third party service providers. By way of example, the third party data 580 may be provided by ecommerce platforms that permit online purchase of products. By way of another example, the third party data 580 may be provided by productivity software suites that provide email, calendar, and messaging services. By way of another example, the third party service provider may be a weather tracking and prediction service that provides the weather data 570.

In some embodiments, the third party data 580 is specific to a given customer. To enable direct communication between the service manager 60 and the third party service providers, the customer may provide the service manager 60 with login credentials (e.g., usernames, passwords, two factor authentication codes, etc.). The service manager 60 may utilize the login credentials to authenticate a connection between the service manager 60 and the third party service providers.

In some embodiments, the third party data 580 includes data related to purchases made by the customer. By way of example, the third party data 580 may indicate what products were purchased and how many products were purchased. By way of another example, the third party data 580 may indicate a size of product purchased. By way of another example, the third party data 580 may indicate a type of packaging of the product purchased (e.g., cardboard, a wooden pallet, packing pellets, plastic wrap, etc.). By way of another example, the third party data 580 may include tracking data for any shipments (e.g., when the product is expected to arrive). By way of another example the third party data 580 may include any requested product returns.

In some embodiments, the third party data 580 includes data related to a customer's personal data (e.g., retrieved from a productivity suite). By way of example, the third party data 580 may include the customer's calendar or schedule (e.g., meetings, appointments, vacations, when they are expected to return home or leave, etc.). By way of another example, the third party data 580 may include the customer's emails or messages (e.g., indicating potential scheduled events or purchases, etc.).

In some embodiments, the third party data 580 include advertisements (e.g., for products or services). The system 10 may display the advertisements on the user device 50 (e.g., through an application) and/or on the customer display 168 of a refuse collection drone. In some embodiments, the advertisements include targeting parameters that indicate where, when, and/or to whom the advertisements should be presented. By way of example, the third party data 580 may indicate specific customers to whom the advertisements should be targeted, and the service manager 60 targets those advertisements to user devices 50 and refuse collection drones 20 associated with those customers. By way of another example, the third party data 580 may indicate a time period when the advertisements should be presented, and the service manager 60 controls user devices 50 and refuse collection drones 20 to provide the advertisements within the requested time period. By way of another example, the third party data 580 may indicate a range of locations (e.g., a geofenced area) where the advertisements should be presented, and the service manager 60 controls user devices 50 and refuse collection drones 20 to provide the advertisements within the requested range of locations.

Refuse Collection Prompts

In some embodiments, the service manager 60 is configured to monitor for one or more conditions that may be indicative of a customer requiring a refuse collection. In response to identifying such a condition, the service manager 60 may control the user device 50 associated with the customer to provide a notification or prompt. The prompts may ask if a refuse collection event is desired and permit the user to schedule a desired refuse collection event.

In some embodiments, the prompts are provided to the customer at predetermined intervals (e.g., weekly, biweekly, monthly, etc.). The interval may be selected by the user when initially creating their account with the system 10. Alternatively, the interval may be determined by the provider of the system 10. If a user does not desire a refuse collection event at the time of the prompt, the user may select a period of time to snooze the prompt.

In some embodiments, the service manager 60 learns the routine of the customer and provides prompts based on a customer's predicted desire for a refuse collection event. By way of example, the service manager 60 may conduct an observational period (e.g., a month, a year, continuously ongoing, etc.) for each new customer, during which the service manager 60 monitors and stores the refuse collection requests 520 for the customer (e.g., historical refuse collection requests). The service manager 60 may determine the average period of time between each refuse collection requests 520 and utilize that as the interval between prompts. Additionally or alternatively, the service manager 60 may monitor for patterns corresponding to the refuse collection requests 520 and predict when the customer will desire refuse collection in the future. By way of example, the service manager 60 may determine that the customer is likely to request refuse collection more often during certain time periods (e.g., at certain times of day, certain days of the week, during certain seasons, after certain holidays, etc.). By way of another example, the service manager 60 may determine that the customer is likely to request refuse collection after certain weather patterns (e.g., storms with winds above a threshold speed, storms that produce above a threshold amount of precipitation, etc.). Based on the historical refuse collection requests 520 for that customer and current conditions (e.g., current date and time, current weather data 570, etc.), the service manager 60 may determine that a customer is likely to desire a refuse collection event and, in response to such a determination, provide a prompt to the customer.

In some embodiments, the service manager 60 provides prompts based on the third party data 580. The service manager 60 may utilize the third party data 580 to determine when a package has been delivered. In response to a determination that a package has been delivered, the service manager 60 may subsequently issue a prompt asking if the customer desires a refuse collection event to dispose of the packaging from the package. The service manager 60 may delay the prompt for a waiting period after the delivery of the package to permit the customer to open the package.

In some embodiments, the service manager 60 utilizes the third party data 580 (e.g., calendar) to determine the customer's schedule. The service manager 60 may analyze the customer's schedule to determine identify a period of time when the customer is more likely to desire a refuse collection event. By way of example, the service manager 60 may predict that the customer is likely to desire a refuse collection event when the customer's schedule indicates that they are likely to be home (e.g., on weekends, evenings, days indicated as being company-wide holidays in the customer's work calendar, etc.). The service manager 60 may provide a prompt to the customer in response to such a prediction. The service manager 60 may determine that a prompt should not be provided when the customer's schedule indicates that they are unlikely to be home (e.g., when the customer is scheduled to be on vacation, flights, appointments, etc.).

In some embodiments, the service manager 60 utilizes data from the connected devices 52 to predict when a customer is likely to desire a refuse collection event. In some embodiments, the service manager 60 utilizes data from the connected devices 52 to determine when the customer is present in their home. By way of example, an activation of a garage door opener, a light, a motion detector, or a door lock may indicate that customer is home. In response to an indication that the customer is present in their home, the service manager 60 may determine that the customer is more likely to desire a refuse collection event. In some embodiments, one of the connected device 52 is a refuse bin. The refuse bin includes a sensor that monitors a fill level of the refuse bin. In response to the fill level exceeding a threshold fill level, the connected device 52 may provide a signal to the service manager 60 indicating that the customer will soon require a refuse collection event. In response to receiving the signal, the service manager 60 may provide a prompt to the customer.

In some embodiments, the service manager 60 monitors the location of the customer directly. By way of example, the service manager 60 may utilize sensor data from the location sensor 430 of a user device 50 carried by the customer to determine the location of the customer. The service manager 60 may determine that the customer is more likely to desire a refuse collection event when the customer is within a threshold distance of their home. By way of example, the service manager 60 may establish a geofence around the customer's home, and the service manager 60 may provide a prompt to the customer when the user device 50 enters the geofence.

Package Delivery

In some embodiments, the refuse collection drones 20 are configured to transport cargo (e.g., packages, goods, letters, etc.) to customers. The system 10 may serve as the final leg of a delivery process, receiving bulk packages from another delivery service (e.g., a postal service or ecommerce platform) and distributing the packages to customers within a community. By utilizing the system 10, the delivery service may reduce the number of stops required to deliver to the community. Additionally, the customers within the community gain the benefit of secure, on demand delivery. The refuse collection drones 20 may additionally retrieve cargo from customers and transport that cargo to a point for pickup by a delivery service.

Referring to FIGS. 8 and 15, in operation the delivery service may deposit one or more packages PKG for delivery into the package storage 36. The delivery service may communicate with the service manager 36 to indicate that the packages PKG have been deposited. In some embodiments, the delivery service may provide package identifier data indicating the destination of each package PKG (e.g., a destination address, an intended recipient, etc.). This package identifier data may be provided as part of the third party data 580 (e.g., the third party may be a delivery service). Alternatively, the service manager 60 may retrieve the package identifier data from image data provided by the cameras 262. By way of example, the package identifier data may be extracted from an image of a barcode or a text-based address. Using the package identifier data, the service manager 60 may identify a customer associated with a destination of the package.

Upon determining that there is a package PKG designated for delivery to a customer, the service manager 60 may provide a notification to the customer (e.g., through their corresponding user device 50). The notification may provide the customer with an option to schedule a delivery time (e.g., at 8:00 PM, as soon as possible, etc.). Based on the customer's response to the notification, the service manager 60 may schedule a delivery at an appropriate time.

To prepare for the delivery, the service manager 60 may select an available refuse collection drone 20. To prepare the refuse collection drone 20 for the delivery, the service manager 60 may utilize the washout system 264 to remove any debris or residue left in the storage compartment 132 from transporting refuse. Specifically, the service manager 60 may command the refuse collection drone 20 into a position accessible by the washout system 264. The service manager 60 may automatically control the operation of the washout system 264 and the movement of the refuse collection drone 20 in tandem to ensure that the entirety of the storage compartment 132 is cleaned. In some embodiments, the camera 262 and/or the camera 166 is utilized to verify that the storage compartment 132 has been cleaned. If debris is detected by the cameras, the cleaning process may be repeated.

After the storage compartment 132 is cleaned, the service manager 60 may control the refuse collection drone 20 to move into a position nearby the package storage 36. The cover 170 may be moved to the open position (e.g., by the cover actuator 174). The identified package PKG may be removed from the package storage 36 and placed into the storage volume 132. In some embodiments, the package PKG is removed from the package storage 36 by the refuse interface 230. In other embodiments, the refuse depot 30 includes a secondary package interface that engages and moves the package PKG into the storage volume 132. After the package PKG has been placed into the storage volume 132 (e.g., as verified by the weight sensor 164), the cover 170 is closed, and the lock 176 is engaged.

The service manager 60 provides a drone route 550 for the refuse collection drone 20 to navigate to a pickup zone PZ associated with the customer for which the package PKG is destined. As the refuse collection drone 20 approaches the pickup zone PZ, a notification may be provided to the customer (e.g., through an associated user device 50). The lock 176 is disengaged, the cover 170 is opened, and the customer removes the package PKG.

Snow Removal

During operation, a customer may request snow removal from the system 10. In some embodiments, the request is provided through a user device 50 associated with the customer. The service manager 60 may periodically review the weather data 570. Based on the weather data 570, the service manager 60 may determine an amount of snowfall in an area nearby the customer. In response to a determination that greater than a threshold amount of snowfall has occurred or is predicted to occur, the service manager 60 may provide a notification prompting the user to request snow removal.

A request for snow removal may include a definition of an area where the snow removal is desired. The area may be predefined by the customer (e.g., when setting up the system 10) or at the time of the request. By way of example, a user may indicate "please remove snow from my driveway," as part of the request. Using data from the environment sensors 162, the controller 142 may determine the boundaries of the area where the snow removal is requested. By way of another example, a customer may be provided with a screen illustrating a plan view of their home, and the user may highlight the areas where snow removal is desired.

In some embodiments, the plow 190 or other snow removal element is removably coupled to the 100 of the refuse collection drone 100. In such an embodiment, the plow 190 may be stored at the refuse depot 30 or another location and coupled to the chassis 100 when snow removal is desired. The service manager 60 may store the storage location of the plot 190 in a memory. In response to a request for snow removal, the service manager 60 may control a refuse collection drone 20 to move to the storage location of the plow 190. The refuse collection drone 20 may include an interface (e.g., a latch, a clutch, a magnet, etc.) that is selectively engaged to couple the plow 190 to the chassis 100. In some embodiments, the refuse collection drone 20 is capable of engaging with the plow 190 without human intervention.

In response to the request for snow removal, the system manager 60 may generate a drone route 550 that causes the refuse collection drone to remove the snow from the identified area. The plow 190 may remove the snow as the refuse collection drone 20 passes over the area. Accordingly, the drone route 550 may pass through the area. In some embodiments, the drone route 550 passes through the area multiple times (e.g., in a zig zag pattern) to permit removal from the entire area. By way of example, the drone route 550 may be selected such that the plow 190 passes over the entirety of the area at least once to completely remove snow from the area.

Locking Storage Volume

Referring to FIGS. 4 and 15, in some embodiments, the system 10 automatically controls the lock 176 of a refuse collection drone 20 to selectively prevent movement of the cover 170. The lock 176 may be controlled by the service manager 60, the controller 142, and/or any other device of the system 10. The lock 176 may prevent unauthorized addition or removal of objects (e.g., refuse, packages, etc.) from the storage volume 132. In some embodiments, the cover 170 seals against the bin 130 when closed to prevent ingress of debris (e.g., dirt, water, etc.) into the storage volume 132, protecting the objects from the debris. The lock 176 may also prevent the cover 170 from opening unintentionally due to wind or other environmental forces.

The system 10 may automatically engage the lock 176 when the refuse collection drone is in transit (e.g., between the pickup zone PZ and the refuse depot 30). In some embodiments, the system 10 automatically engages or disengages the lock 176 in response to the refuse collection drone 20 crossing a geofence boundary (e.g., around the refuse depot 30, around a pickup zone PZ, etc.). In some embodiments, the system 10 automatically engages the lock 176 in response to the sensor 172 detecting that the cover 170 has closed. In some embodiments, the system 10 requires an interaction from a customer and/or a user device 50 of a customer to disengage the lock 176 (e.g., when the refuse collection drone 20 is in the pickup zone PZ). By way of example, the service manager 60 may compare the location of the refuse collection drone 20 with the location of the user device 50 associated with a customer that requested a refuse collection event or a package delivery. In response to a determination that the refuse collection drone 20 is within a threshold distance of the user device 50, the lock 176 may automatically disengage. By way of another example, the system 10 requires a user interaction with the user device 50 or the customer display 168 (e.g., entering a passcode, accepting a popup notification, providing a voice command, etc.).

Alternative Configurations

Figure 16:
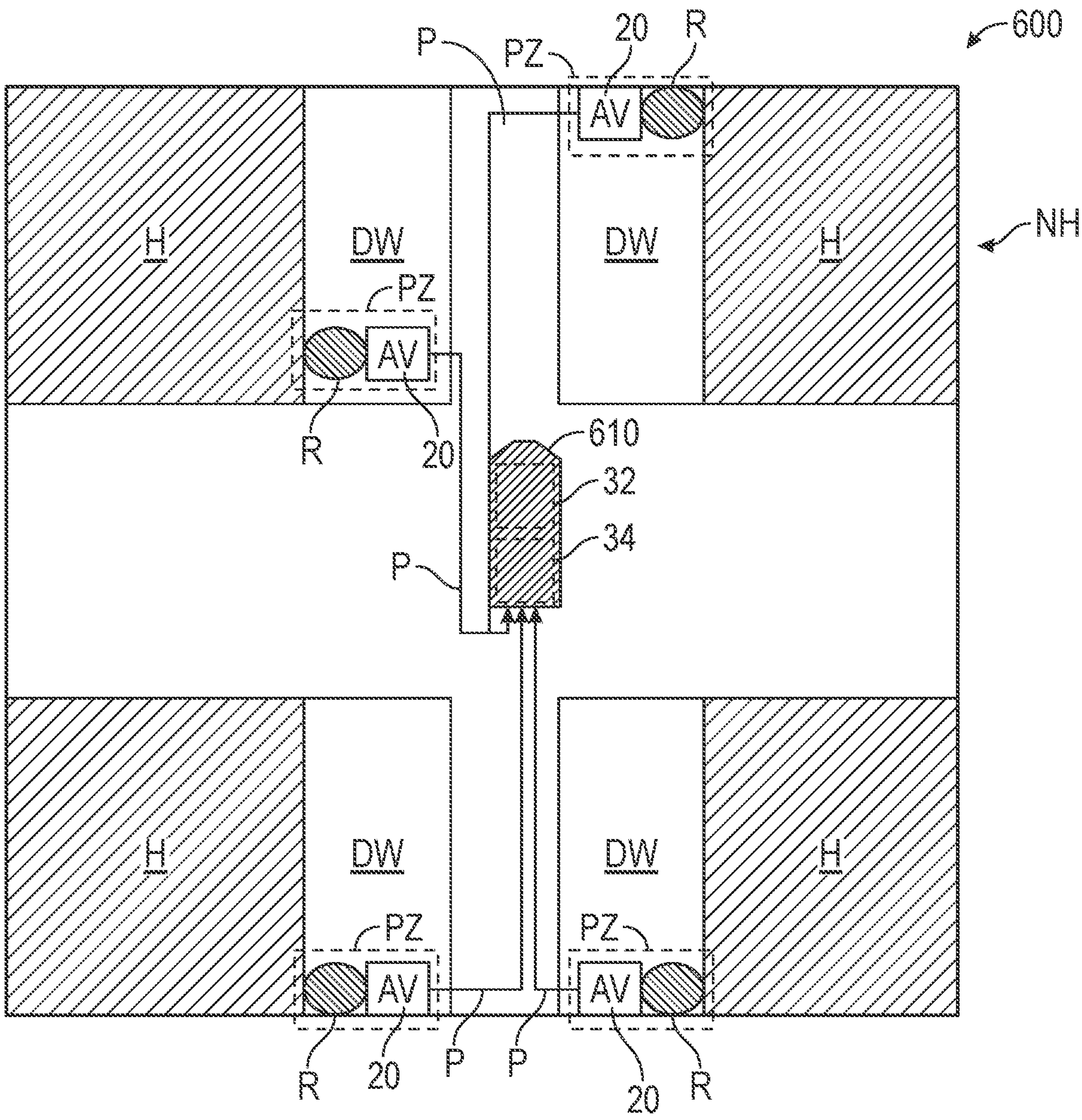
FIG. 16 is a plan view of an implementation of the refuse collection system of FIG. 1 within a residential neighborhood, according to an alternative embodiment.

Referring to FIG. 16, a refuse collection system is shown as system 600 according to an exemplary embodiment. The system 600 may be substantially similar to the system 10 except as otherwise stated herein. In the system 10, the refuse depot 30 is immobile, and the refuse collection drones 20 and refuse vehicles 40 propel themselves to travel to the refuse depot 30. In contrast, the refuse depot 30 and the refuse vehicles 40 are replaced with a mobile refuse depot 610. The mobile refuse depot 610 includes the features of the refuse depot 30, such as the centralized storage 32, the charging stations 34, the refuse interface 230, and the refuse actuators 232, on a mobile chassis. For example, the mobile refuse depot 610 may include the frame 310, the engine 320, and the wheels 322 of the refuse vehicle 40. The mobile refuse depot 610 may be manually controlled by an operator and/or autonomously controlled by a controller.

FIG. 16 illustrates an application of the system 600 in a neighborhood NH similar to the neighborhood NH of FIG. 2A. In operation, the mobile refuse depot 610 travels along a refuse collection route along the streets S of the neighborhood NH. The refuse collection drones 20 may initially be stationed on charging stations 34 within the mobile refuse depot 610. When the mobile refuse depot 610 enters the neighborhood NH, the refuse collection drones 20 may exit the mobile refuse depot 610 and move along paths P toward the pickup zones PZ to collect refuse R. After the refuse R is collected, the refuse collection drones 20 return to the mobile refuse depot 610 to unload the refuse R into the centralized storage 32. Throughout this process, the mobile refuse depot 610 may move along the street S. The speed of the mobile refuse depot 610 may be slow enough relative to the speeds of the refuse collection drones 20 to facilitate the refuse collection drones 20 collecting the refuse R and returning to the mobile refuse depot 610 without the refuse collection drones 20 falling behind the mobile refuse depot 610. Due to refuse collection drones 20 moving with the mobile refuse depot 610, the system 600 may be required to operate according to a predetermined schedule, as opposed to the customer-dictated scheduling of the system 10.

In an alternative embodiment, the charging stations 34 are not positioned on the mobile refuse depot 610. Instead, each house is provided with a corresponding refuse collection drone and charging station 34. The refuse collection drone 20 normally remains stationary and idle at the home H, during which time the refuse collection drone 20 can be loaded with refuse by a customer and charged by the charging station 34. When the mobile refuse depot 610 arrives in the neighborhood NH, the refuse collection drone 20 automatically travels to the mobile refuse depot 610 to deposit refuse. After the refuse has been transferred, the refuse collection drone 20 returns to the corresponding house H and once again becomes idle.

Figure 17:
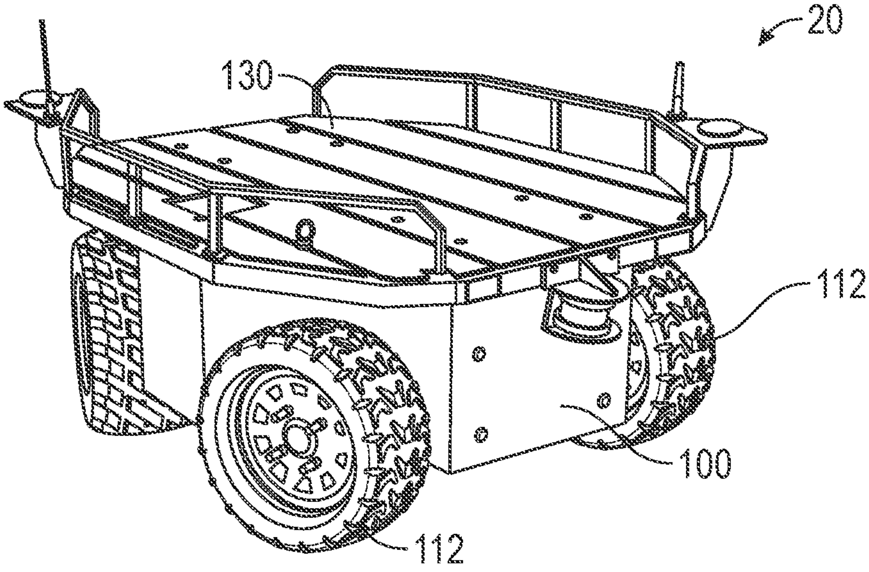
FIGS. 17-19 are perspective views of the refuse collection drone of FIG. 4, according to various alternative embodiments.
Figure 18:
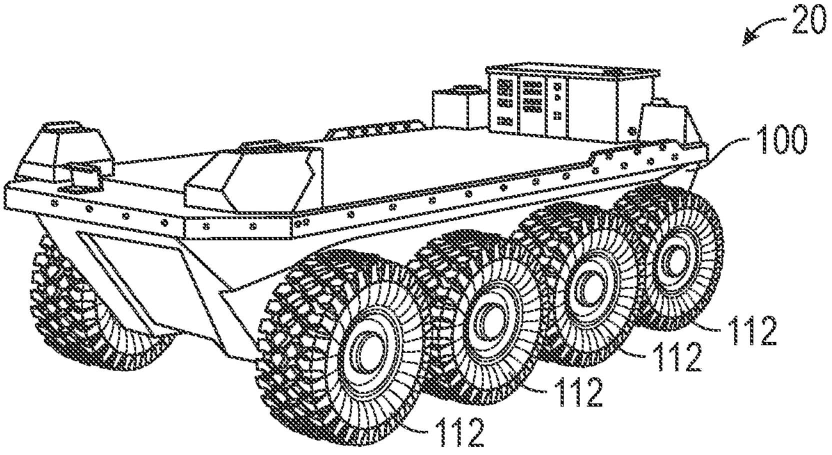
Figure 19:
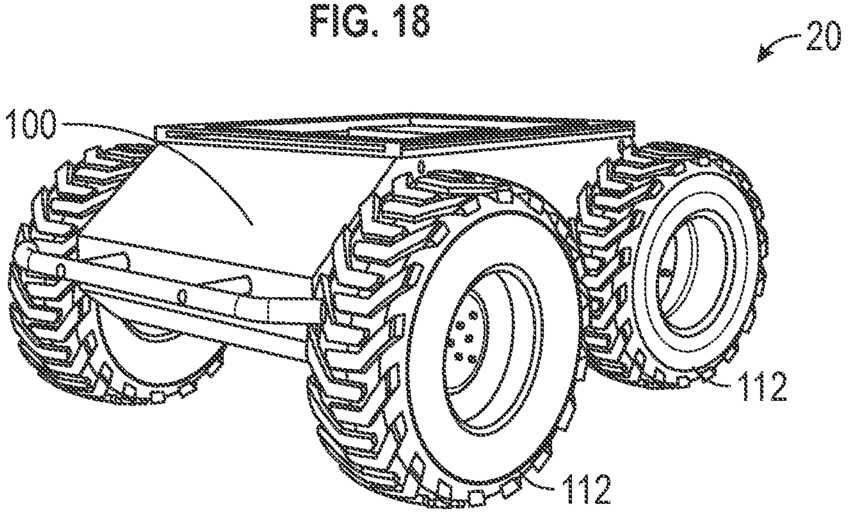

FIGS. 17-19 illustrate various alternative embodiments of the refuse collection drones 20.

As utilized herein with respect to numerical ranges, the terms "approximately," "about," "substantially," and similar terms generally mean+/−10% of the disclosed values. When the terms "approximately," "about," "substantially," and similar terms are applied to a structural feature (e.g., to describe its shape, size, orientation, direction, etc.), these terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the system 10 and the system 600 as shown in the various exemplary embodiments is illustrative only. Additionally, any element disclosed in one embodiment may be incorporated or utilized with any other embodiment disclosed herein. For example, the mobile refuse depot 610 of the exemplary embodiment shown in at least FIG. 16 may be incorporated in the system 10 of the exemplary embodiment shown in at least FIG. 2A. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A refuse collection system, comprising:

a refuse collection robot including:

a chassis;

a tractive element coupled to the chassis;

a motor coupled to the chassis and the tractive element and configured to drive the tractive element to propel the refuse collection robot;

a refuse container coupled to the chassis and defining a first storage volume; and a controller operatively coupled to the motor; and a refuse depot including:

a centralized storage defining a second storage volume; and a refuse actuator configured to transfer refuse from the first storage volume to the second storage volume, wherein the controller is configured to control the refuse collection robot to navigate to a pickup zone associated with a customer in response to a request for refuse collection from a user device associated with the customer; and wherein the refuse collection robot further includes (a) a cover coupled to the refuse container and moveable from an open position to a closed position to limit access to the first storage volume and (b) a lock configured to limit movement of the cover when engaged, and wherein the controller is configured to disengage the lock in response to an indication that the refuse collection robot is within a threshold distance of the refuse depot.

2. The refuse collection system of claim 1, wherein the controller is configured to control the refuse collection robot to autonomously navigate the refuse collection robot to the pickup zone.

3. The refuse collection system of claim 2, wherein the controller is configured to control the refuse collection robot to return to the refuse depot in response to an indication that the refuse has been placed in the first storage volume.

4. The refuse collection system of claim 3, wherein the indication that the refuse has been placed in the first storage system volume at least one of (a) a sensor onboard the refuse collection robot detecting the placement of the refuse in the first storage volume or (b) a signal from the user device.

5. The refuse collection system of claim 1, wherein the refuse depot includes a frame coupled to a refuse collection arm, and wherein the frame of the refuse depot is fixedly coupled to a ground surface.

6. The refuse collection system of claim 5, wherein the refuse actuator is configured to remove the refuse from the refuse container from the first storage volume while the refuse container is coupled to the chassis.

7. The refuse collection system of claim 5, wherein the refuse container is removably coupled to the chassis, and wherein the refuse actuator is configured to remove the refuse container from the chassis when transferring the refuse to the second storage volume.

8. The refuse collection system of claim 1, wherein the refuse collection robot includes a first charging interface and an energy storage device configured to power the motor, and wherein the refuse depot includes a second charging interface configured to transfer energy to the energy storage device through the first charging interface.

9. The refuse collection system of claim 8, wherein the energy storage device is a battery, and wherein the second charging interface is configured to transfer the energy wirelessly to the first charging interface.

10. The refuse collection system of claim 8, wherein the refuse depot includes at least one wall that defines an enclosed volume, and wherein the refuse collection robot is at least partially contained within the enclosed volume when the first charging interface is in communication with the second charging interface.

11. The refuse collection system of claim 1, further comprising a refuse vehicle configured to remove the refuse from the centralized storage of the refuse depot.

12. The refuse collection system of claim 11, further comprising a cloud controller in communication with the user device and the refuse collection robot, wherein the cloud controller is configured to receive the request from the user device and provide instructions to the controller of the refuse collection robot, the instructions including a location of the pickup zone.

13. The refuse collection system of claim 12, wherein the refuse depot includes a sensor configured to provide sensor data related to a fill level of the centralized storage, and wherein the cloud controller is configured to provide an instruction for the refuse vehicle to empty the refuse from the centralized storage.

14. The refuse collection system of claim 11, wherein the refuse vehicle includes an interface configured to engage the centralized storage and an actuator configured to lift the interface and the centralized storage.

15. The refuse collection system of claim 1, wherein the controller is configured to disengage the lock in response to a determination that the refuse collection robot is within the pickup zone.

16. The refuse collection system of claim 1, wherein the pickup zone is positioned within a building, and wherein the refuse depot is positioned outside of the building.

17. A refuse collection system, comprising:

a refuse collection robot including:

a chassis;

a tractive element coupled to the chassis;

an electric motor coupled to the chassis and the tractive element;

a battery electrically coupled to the electric motor;

a first charging interface;

a refuse container coupled to the chassis and defining a first storage volume; and a controller operatively coupled to the motor; and a refuse depot including:

a second charging interface configured to supply energy to charge the battery through the first charging interface;

a frame anchored to a ground surface;

a centralized storage defining a second storage volume; and a refuse actuator coupled to the frame and configured to transfer refuse from the first storage volume to the second storage volume, a cloud controller configured to:

identify a pickup zone associated with a customer in response to a request for refuse collection from a user device associated with the customer;

provide a first command that causes the controller to navigate the refuse collection robot to the pickup zone without an input from a user; and in response to a determination that the refuse has been placed in the first storage volume, provide a second command that causes the controller to navigate the refuse collection robot to the refuse depot without an input from a user.

18. A refuse collection system, comprising:

a refuse collection robot including:

a chassis;

a tractive element coupled to the chassis;

a motor coupled to the chassis and the tractive element and configured to drive the tractive element to propel the refuse collection robot;

a refuse container coupled to the chassis and defining a first storage volume;

a controller operatively coupled to the motor; and a refuse depot including:

a centralized storage defining a second storage volume; and a refuse actuator configured to transfer refuse from the first storage volume to the second storage volume, and a first charging interface and an energy storage device configured to power the motor, wherein the refuse depot includes a second charging interface configured to transfer energy to the energy storage device through the first charging interface wherein the controller is configured to control the refuse collection robot to navigate to a pickup zone associated with a customer in response to a request for refuse collection from a user device associated with the customer.

* * * * *